(12) United States Patent
Lee et al.

(10) Patent No.: US 10,760,811 B2
(45) Date of Patent: *Sep. 1, 2020

(54) METHOD FOR CONTROLLING AIR CONDITIONER SYSTEM

(71) Applicants: LG ELECTRONICS INC., Seoul (KR); Pusan National University Industry—University Cooperation Foundation, Pusan (KR)

(72) Inventors: Hakrae Lee, Seoul (KR); Jinho Kim, Seoul (KR); Chulmin Park, Seoul (KR); Donggi Eom, Seoul (KR); Seontae Yoon, Seoul (KR); Kyongdo Lee, Seoul (KR); Kwonhyung Lee, Seoul (KR); Sukchan Kim, Pusan (KR)

(73) Assignees: LG ELECTRONICS INC., Seoul (KR); PUSAN NATIONAL UNIVERSITY INDUSTRY-UNIVERSITY COOPERATION FOUNDATION, Pusan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,119

(22) Filed: Sep. 27, 2018

(65) Prior Publication Data
US 2019/0093916 A1    Mar. 28, 2019

(30) Foreign Application Priority Data

Sep. 28, 2017   (KR) .................... 10-2017-0126495

(51) Int. Cl.
*F24F 11/58* (2018.01)
*F24F 1/0003* (2019.01)
(Continued)

(52) U.S. Cl.
CPC ............ *F24F 11/58* (2018.01); *F24F 1/0003* (2013.01); *F24F 11/52* (2018.01); *F24F 11/61* (2018.01);
(Continued)

(58) Field of Classification Search
CPC .......... F24F 11/58; F24F 1/0003; F24F 11/62; F24F 11/64; F24F 11/88; F24F 11/52;
(Continued)

(56) References Cited

U.S. PATENT DOCUMENTS 5,499,510 A * 3/1996 Yoshida ................. F24F 3/065
165/205
6,290,141 B1 * 9/2001 Park ........................ F24F 11/006
236/51
(Continued)

FOREIGN PATENT DOCUMENTS

CN    104896658    9/2015
CN    106322662    1/2017
(Continued)

OTHER PUBLICATIONS

Korean Notice of Allowance dated Apr. 24, 2019.
(Continued)

*Primary Examiner* — Andrew Lai
*Assistant Examiner* — Harry H Kim
(74) *Attorney, Agent, or Firm* — Ked and Associates LLP

(57) ABSTRACT

A method for controlling an air conditioner system may include a preset reception rate degradation error occurs in one or more indoor unit, transmitting a channel switch request signal to an outdoor unit belonging to a particular group; performing a channel scan by each of the outdoor unit and the plurality of indoor units; transmitting, by the plurality of indoor units, channel scan results to the outdoor unit; determining, by the outdoor unit, a channel to be used
(Continued)

by the particular group based on a result of a channel scan performed by the outdoor unit and the channel scan results received from the plurality of indoor units; and outputting, by the outdoor unit, information on the channel to the plurality of indoor units. Accordingly, the communication channel may be changed to an optimal communication channel according to a change a communication environment.

20 Claims, 13 Drawing Sheets

(51) Int. Cl.
    *G05B 21/00*     (2006.01)
    *F24F 11/62*     (2018.01)
    *F24F 11/61*     (2018.01)
    *F24F 11/64*     (2018.01)
    *F24F 11/88*     (2018.01)
    *F24F 11/52*     (2018.01)
    *F24F 11/30*     (2018.01)
    *F24F 11/56*     (2018.01)
    *H04W 72/04*     (2009.01)
    *H04W 72/02*     (2009.01)

(52) U.S. Cl.
    CPC .............. *F24F 11/62* (2018.01); *F24F 11/64* (2018.01); *F24F 11/88* (2018.01); *G05B 21/00* (2013.01)

(58) Field of Classification Search
    CPC .......... F24F 11/61; G05B 21/00; H04W 4/33; H04W 72/02; H04W 72/0486; H04W 84/18
    See application file for complete search history.

(56) References Cited

U.S. PATENT DOCUMENTS

| | | | | |
|---|---|---|---|---|
| 10,015,259 | B1* | 7/2018 | Frigo | G01D 21/00 |
| 2002/0080739 | A1* | 6/2002 | Kuwahara | H04W 16/14 |
| | | | | 370/333 |
| 2006/0082489 | A1* | 4/2006 | Liu | H04B 17/345 |
| | | | | 342/52 |
| 2007/0280681 | A1* | 12/2007 | Frankel | H04J 14/0295 |
| | | | | 398/5 |
| 2008/0069041 | A1* | 3/2008 | Tandai | H04W 74/0866 |
| | | | | 370/329 |
| 2012/0057651 | A1* | 3/2012 | Kim | H04L 27/0006 |
| | | | | 375/296 |
| 2013/0058380 | A1* | 3/2013 | Kim | H04W 72/085 |
| | | | | 375/146 |
| 2014/0362688 | A1* | 12/2014 | Zhang | H04W 28/0289 |
| | | | | 370/230 |
| 2015/0305040 | A1 | 10/2015 | Xia et al. | |
| 2015/0305050 | A1 | 10/2015 | Xia et al. | |
| 2016/0154413 | A1 | 6/2016 | Trivedi et al. | |
| 2017/0041954 | A1* | 2/2017 | Tsai | H04W 16/14 |
| 2017/0245153 | A1* | 8/2017 | Singh | H04W 16/10 |
| 2017/0317906 | A1* | 11/2017 | Tsai | H04L 43/0847 |
| 2018/0338335 | A1* | 11/2018 | Mukherjee | H04L 27/0006 |
| 2018/0343670 | A1* | 11/2018 | Park | H04W 72/1289 |
| 2019/0093915 | A1* | 3/2019 | Lee | F24F 11/58 |

FOREIGN PATENT DOCUMENTS

| | | | |
|---|---|---|---|
| CN | 107135546 | 9/2017 | |
| EP | 1 826 498 | 8/2007 | |
| EP | 2249091 B1 * | 10/2009 | ............. F24F 11/00 |
| JP | 2006-207949 | 8/2006 | |
| KR | 10-2002-0059732 | 7/2002 | |
| KR | 10-2003-0017618 | 3/2003 | |
| KR | 10-2007-0008944 | 1/2007 | |
| KR | 10-2008-0035174 | 4/2008 | |
| KR | 10-2011-0050022 | 5/2011 | |
| KR | 10-2012-0032926 | 4/2012 | |
| KR | 2015-032980 | 2/2015 | |
| KR | 10-2015-0075163 | 7/2015 | |
| KR | 10-2016-0114122 | 10/2016 | |
| KR | 10-1679842 | 11/2016 | |
| KR | 10-2016-0145630 | 12/2016 | |

OTHER PUBLICATIONS

European Search Report issued in Application No. 18197246.4-1008 dated Jan. 22, 2019.
European Search Report issued in Application No. 18197252.2-1008 dated Jan. 24, 2019.
U.S. Appl. No. 16/114,044, filed Sep. 27, 2018, Robert E. Fennema.
U.S. Appl. No. 16/144,119, filed Sep. 27, 2018, Robert E. Fennema.
Korean Office Action dated Nov. 15, 2018 issued in co-pending Korean Application No. 10-2017-0126494.
Korean Notice of Allowance dated Nov. 15, 2018 issued in co-pending Korean Application No. 10-2017-0126495.
U.S. Office issued in U.S. Appl. No. 16/144,044 Action dated Jan. 10, 2020.

\* cited by examiner

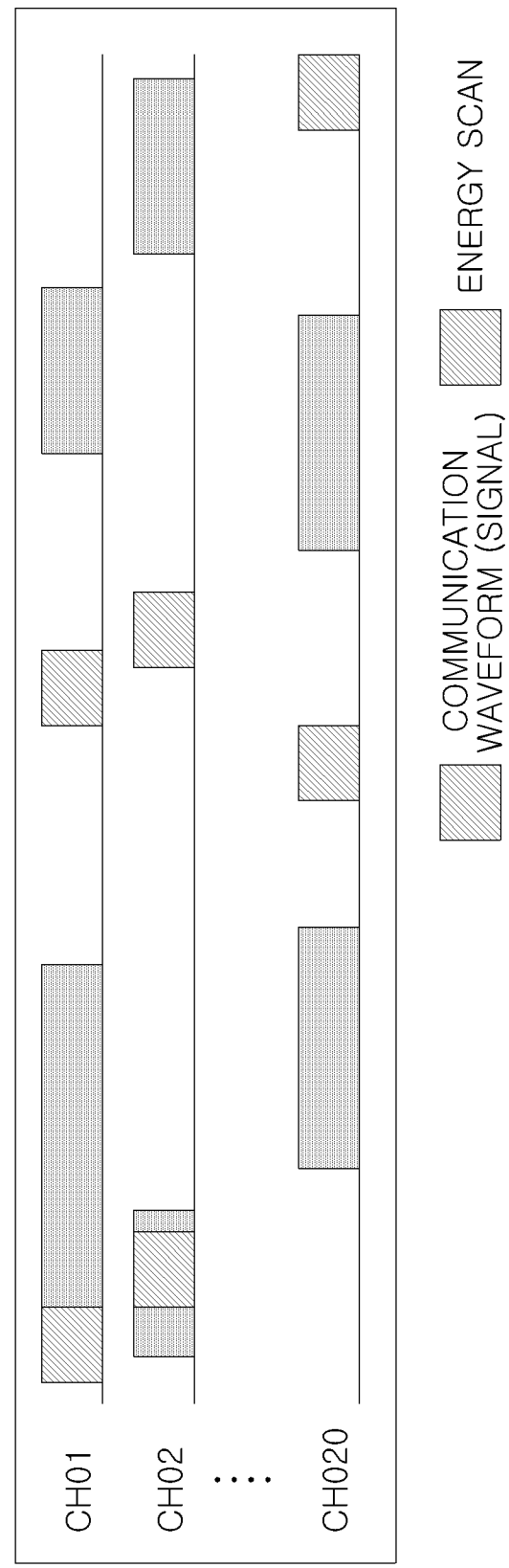

FIG. 11A

|  | SCAN RESULT OF OUTDOOR UNIT | SCAN RESULT OF FIRST INDOOR UNIT | SCAN RESULT OF SECOND INDOOR UNIT |
|---|---|---|---|
| CH01 | 40% | 30% | 28% |
| CH02 | 25% | 30% | 30% |
| CH03 | 0 | 0 | 0 |
| CH04 | 0 | 0 | 0 |
| CH05 | 10% | 0 | 0 |
| CH06 | 35% | 40% | 40% |

|  | SCAN RESULT | HOMOGENEITY | HETEROGENEITY |
|---|---|---|---|
| CH01 | 10% | 6% | 4% |
| CH02 | 10% | 3% | 7% |
| CH03 | 20% | 18% | 2% |
| CH04 | 30% | 20% | 10% |
| CH05 | 30% | 25% | 5% |

⋮

METHOD FOR CONTROLLING AIR CONDITIONER SYSTEM

CROSS-REFERENCE TO RELATED APPLICATION

This application claims the priority benefit of Korean Patent Application No. 10-2017-0126495, filed on Sep. 28, 2017 in the Korean Intellectual Property Office, the disclosure of which is incorporated herein by reference.

BACKGROUND

1. Field

An air conditioner system and a control method for controlling an air conditioner system are disclosed herein.

2. Background

An air conditioner may provide a comfortable and pleasant indoor environment to humans by discharging cold air to a room to adjust an indoor temperature and purify air of the room. The air conditioner may include an indoor unit including a heat exchanger or an indoor heat exchanger, which may be installed in a room. The air conditioner may also include an outdoor unit including a compressor and a heat exchanger or an outdoor heat exchanger, for example, and the outdoor unit may supply a refrigerant to the indoor unit.

The air conditioner, in which the indoor unit and the outdoor unit are separately controlled, may be operated by controlling power supplied to the compressor or the heat exchangers. The outdoor unit and the indoor unit may be connected by a refrigerant pipe. Compressed refrigerant from the compressor of the outdoor unit may be supplied to the indoor heat exchanger through the refrigerant pipe. Heat-exchanged refrigerant in the indoor heat exchanger may flow back into the compressor of the outdoor unit through the refrigerant pipe. As a result, the indoor unit may discharge the cold or hot air into the room via a heat exchange using the refrigerant.

Air conditioners may be interconnected between buildings or interconnected in small groups. An air conditioner system or an air conditioning system may transmit and receive data, and monitor a condition of the corresponding air conditioners based on the transmitted and received data. Recently, more attempts have been made to provide wireless communication between units, so there are increasing cases in which a wireless network is configured between not just units, such as an indoor unit, an outdoor unit, a controller, for example, but also other devices, such as a mobile terminal.

Due to wireless communication, it is possible to check information of devices and to control such devices without limiting the locations of a user and the devices. However, as the number of devices connected via wireless communication increases, communication quality may be degraded, communication speed may be reduced, and/or communication interference may increase unless an optimal communication channel configuration is made. Thus, there is need of a method of allowing wirelessly connected units to set an optimal communication channel, and a method of changing a communication channel according to a change in a communication environment during use.

BRIEF DESCRIPTION OF THE DRAWINGS

The embodiments will be described in detail with reference to the following drawings in which like reference numerals refer to like elements, and wherein:

FIGS. 10A-10B are diagrams illustrating a method for controlling an air conditioner system according to an embodiment;

FIG. 11A is a diagram explaining a method for controlling an air conditioner system according to an embodiment;

FIG. 11B is a diagram explaining a method for controlling an air conditioner system according to an embodiment; and, FIG. 12 is a flowchart illustrating a method for controlling an air conditioner system according to an embodiment.

DETAILED DESCRIPTION

Figure 1:
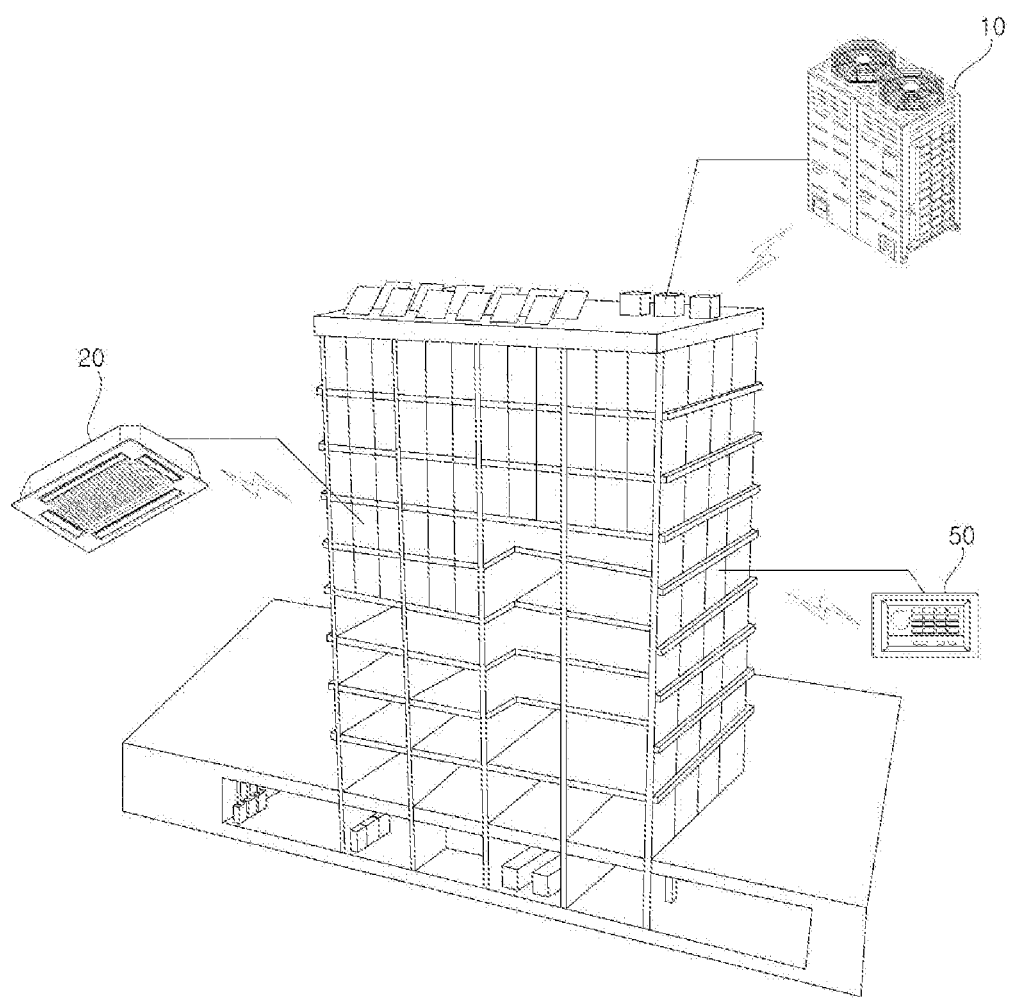
FIG. 1 is a diagram schematically illustrating a configuration in which an air conditioner system according to an embodiment is installed in a building.

Hereinafter, embodiments disclosed herein will be described with reference to the accompanying drawings. While the embodiments will be described in conjunction with exemplary embodiments, it will be understood that the description is not intended to limit the embodiments to the exemplary embodiments. In the drawings, in order to clearly and briefly describe the embodiments, components which are not related to the description will be omitted, and like reference numerals refer to like elements throughout.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. The word "unit" may also refer to a device or an assembly.

FIG. 1 is a diagram schematically illustrating a configuration in which an air conditioner system according to an embodiment is installed in a building. Referring to FIG. 1, an air conditioner system may include an outdoor unit 10, an indoor unit 20, and a controller 50. In addition to the indoor unit 20 and the outdoor unit 10, the air conditioner system may include a ventilator, an air purifier, a humidifier, or a heater, for example, and may further include other units or devices, such as a chiller, an air conditioning unit, and a cooling tower, depending on a size of the air conditioner system. In addition, the air conditioner system may be operatively connected to a mobile device, a security device, or an alarm device, for example located in the building.

The controller 50 may control an operation of the indoor unit 20 and the outdoor unit 10 in accordance with an input user command, may periodically receive and store data of corresponding operation states of the indoor unit and the outdoor unit, and may output the operation states through a monitor screen. The controller 50 may perform operation setting, lock setting, schedule control, group control, peak control regarding power consumption, or demand control, for example, of the indoor unit 20.

The outdoor unit 10 may be connected to the indoor unit 20 to supply refrigerant to the indoor unit 20. In addition, the outdoor unit 10 may periodically communicate with a plurality of indoor units 20 such that the outdoor unit 10 may transmit and/or receive data with respect to the plurality of indoor units 20, and may change an operation based on an operating setting changed through an indoor unit.

The indoor unit 20 may include an electronic expansion valve that expands refrigerant supplied from the outdoor unit 10, an indoor heat exchanger that heat-exchanges refrigerant, an indoor unit fan or indoor fan, a plurality of sensors, and a control means or indoor controller that controls an operation of the indoor unit. The indoor fan may allow indoor air to flow into the indoor heat exchanger and may allow heat-exchanged air to be exposed to an indoor room or an interior of a building The indoor unit 20 may further include a discharge port or outlet that discharges the heat-exchanged air. The discharge port may be provided with a wind direction adjusting means, vane, louver, or vent that may close the discharge port and control a direction of the discharged air. The indoor unit 20 may control the rotating speed of the indoor fan, thereby controlling intake air and air to be discharged and controlling an air flow rate. The indoor unit 20 may further include an output unit, output, or display that displays an operation state and setting data or input data of the indoor unit, and an input unit or input where a user may input the setting data or the input data. The indoor unit 20 may transmit the input data regarding air conditioner operation to a remote controller connected thereto, output the input data via the remote controller, and receive data.

The remote controller may be connected to the indoor unit via wired communication or wireless communication to input a user command to the indoor unit, receive data of the indoor unit, and output the received data. According to a method of connection with the indoor unit, the remote controller may transmit the user command to the indoor unit and perform one-directional communication in which data on the indoor unit is not received, or perform bidirectional communication in which data is both transmitted and received with respect to the indoor unit.

The outdoor unit 10 may operate in a cooling mode or a heating mode in response to data received from the indoor unit 20 or a control command received from the controller, and may supply refrigerant to the indoor unit. In the presence of a plurality of outdoor units, each outdoor unit may be connected to a plurality of indoor units, and the plurality of indoor units may supply refrigerant to the plurality of indoor units via a distributor.

The outdoor unit 10 may include at least one compressor that compresses the refrigerant and discharges a pressurized gas refrigerant, an accumulator that separates gas refrigerant and liquid refrigerant from the refrigerant to prevent non-vaporized liquid refrigerant from entering the compressor, an oil collection unit or an oil collector that collects oil from the refrigerant discharged from the compressor, an outdoor heat exchanger that condensed or evaporates the refrigerant via heat exchange with the outside air, an outdoor unit fan or outdoor fan, a four-way valve that changes the refrigerant flow path according to an operation mode of the outdoor unit, at least one pressure sensor that measures pressure, at least one temperature sensor that measures temperature, and a control unit or outdoor controller that controls an operation of the outdoor unit and communicates with other units or devices. The outdoor fan may introduce air into the outdoor heat exchanger in order to facilitate the heat exchange of the outdoor heat exchanger, and may discharge the heat-exchanged air to an outside of the air conditioner. The outdoor unit 10 may further include a plurality of sensors, valves, and super-coolers, for example, but description thereof may be omitted below.

In addition, the air conditioner system may transmit and receive data with respect to another air conditioner via a network connection such as the Internet. An air conditioner may access an external service center, a management server, or a database, for example, via the controller, and may communicate with an external terminal via a network. The terminal may access at least one unit or device in the air conditioner system, and monitor and control an operation of the air conditioner system as a second controller.

In addition, the outdoor unit 10, the indoor unit 20, and the controller 50 may wirelessly communicate directly with each other via a predetermined wireless communication method, and the outdoor unit 10, the indoor unit 20, and the controller 50 may wirelessly communicate directly with a mobile terminal 200 via the predetermined wireless communication method. A user may therefore be able to conveniently monitor a state of each unit or device using the mobile terminal 200, and control each unit. That is, the user may control the outdoor unit 10, the indoor unit 20, and/or the controller 50 via the mobile terminal 200.

Figure 2:
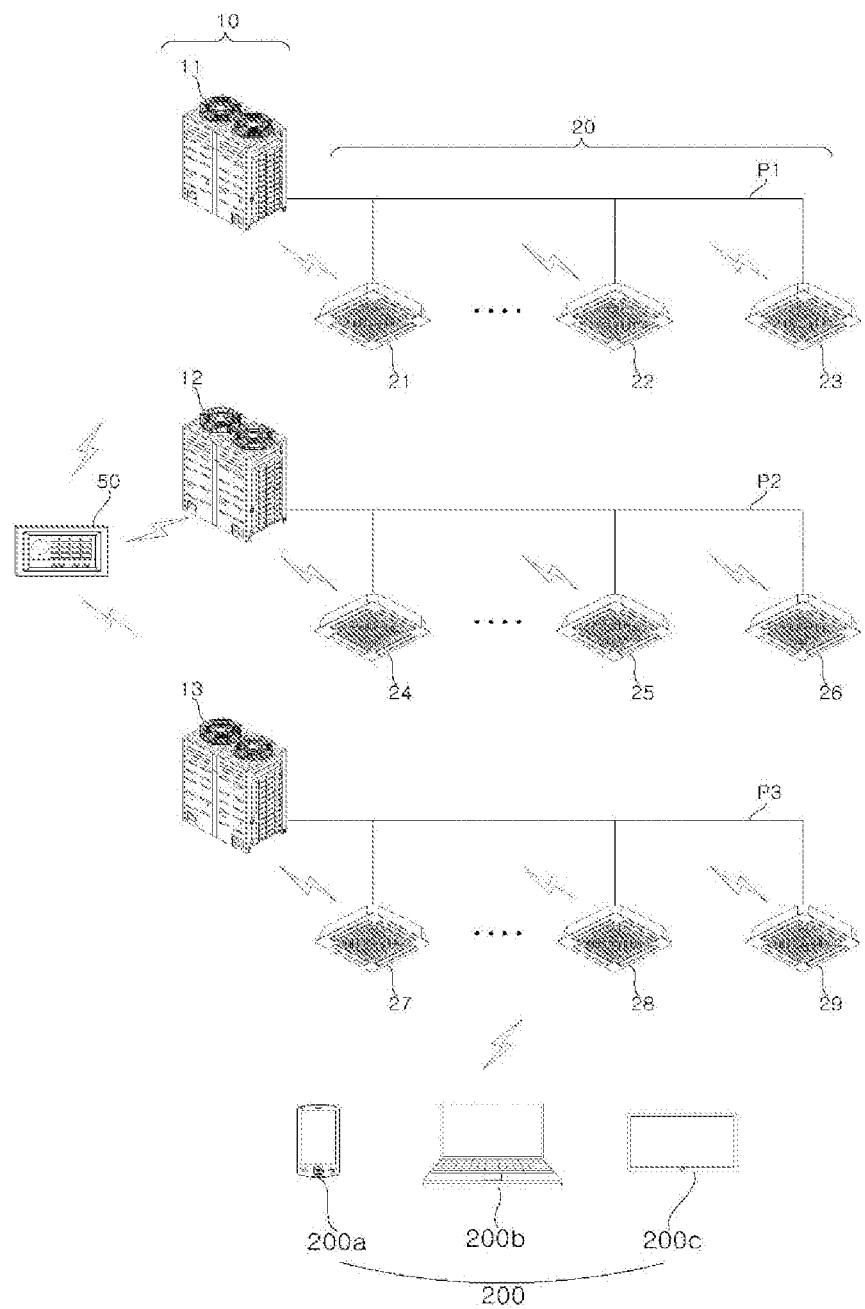
FIG. 2 is a diagram illustrating a configuration of an air conditioner system according to an embodiment.

FIG. 2 is a diagram illustrating a configuration of an air conditioner system according to an embodiment. Referring to FIG. 2, an indoor unit 20, an outdoor unit 10, and a controller 50 may transmit and receive data via a wireless communication method in the air conditioner system. The indoor unit 20 may include a plurality of indoor units 20. The plurality of indoor units 20 may include first indoor unit 21, second indoor unit 22, and third indoor unit 23, for example. The plurality of indoor units 20 may further include fourth, fifth, sixth, seventh, eighth, and ninth indoor units 24-29, for example. The outdoor unit 10 may include a plurality of outdoor units 10. The plurality of outdoor units 10 may include first outdoor unit 11, second outdoor unit 12, and third outdoor unit 13, for example. The plurality of outdoor units 10 may be connected to the plurality of indoor units 20 via refrigerant pipes P1, P2, and P3, and may transmit and receive data with respect to the plurality of indoor units 20 via a wireless communication method. Each outdoor unit of the plurality of outdoor units 10 may communicate with a plurality of indoor units 20. For example, first outdoor unit 11 may communicate with first, second, and third indoor units 21, 22, and 23 in the plurality of indoor units 20.

By periodically or repeatedly communicating with the plurality of indoor units 20, the plurality of outdoor units 10 may transmit and receive data with respect to the indoor units 20 and change an operation according to a change of operation setting or operation input of the indoor units 20. The plurality of outdoor units 10 and the plurality of indoor units 20 may transmit and receive data via a wireless communication method.

The plurality of indoor units 20 may communicate with the outdoor units 10, and also may communicate with the controller 50 via a wireless communication method. The first outdoor unit 11 may be connected to the first, second, and third indoor units 21, 22, and 23 via a first refrigerant pipe P1; the second outdoor unit 12 may be connected to the fourth, fifth, and sixth indoor units 24, 25, and 26 via a second refrigerant pipe P2; and the third outdoor unit 13 may be connected to the seventh, eighth, and ninth indoor units 27, 28, and 29 via a third refrigerant pipe P3. Each outdoor unit of the plurality of outdoor units 10 may be described as being connected to three indoor units of the plurality of indoor units 20, but it is merely exemplary and there is no limitation on the number or shape of indoor units. That is, the first, second, and third outdoor units 11, 12, and 13 may each be connected to more than three indoor units in the plurality of indoor units 20.

Refrigerant may be supplied to the first, second, and third indoor units 21, 22, and 23 from the first outdoor unit 11 upon operation of the first outdoor unit 11; refrigerant may be supplied to the fourth, fifth, and sixth indoor units 24, 25, and 26 via the second refrigerant pipe P2 from the second outdoor unit 12 upon operation of the second outdoor unit 12; and refrigerant may be supplied to the seventh, eighth, and ninth indoor units 27, 28, and 29 from the third outdoor unit 13 via the third refrigerant pipe P3 upon operation of the third outdoor unit 13.

Air conditioners may be grouped by an outdoor unit of the plurality of outdoor units 10, and each group of air conditioners may communicate using a different channel. An indoor unit in the plurality of indoor units 20 may perform a heat exchange using refrigerant supplied from an outdoor unit in the plurality of outdoor units 10 and may discharge cold or hot air, and thus, the indoor units of the plurality of indoor units 20 and the outdoor units of the plurality of outdoor units 10 connected via a refrigerant pipe may be set as one group.

For example, the first outdoor unit 11 may form a first group with the first, second, and third indoor units 21, 22, and 23 connected thereto via the first refrigerant pipe P1; the second outdoor unit 12 may form a second group with the fourth, fifth, and sixth indoor units 24, 25, and 26 connected thereto via the second refrigerant pipe P2; and the third outdoor unit 13 may form a third group with the seventh, eighth, and ninth indoor units 27, 28, and 29 connected thereto via the third refrigerant pipe P3. An outdoor unit of the plurality of outdoor units 10 and a controller 50 may form a group according to where they are installed. A state of connection via a refrigerant pipe, such as first, second, or third refrigerant pipes P1, P2, or P3, may be distinguished based on whether there is a change in temperature of an indoor unit in the plurality of indoor units 20 via a supply of refrigerant from an outdoor unit in the plurality of outdoor units 10 when the outdoor unit and the indoor unit are operated.

The controller 50 may communicate with the plurality of indoor units 20 or the plurality of outdoor units 10, regardless of a group. The controller 50 may control an operation of the plurality of indoor units 20 and the plurality of outdoor units 10. In response to an input user command, the controller 50 may periodically receive and store data of a corresponding operation of the plurality of indoor units 20 and the plurality of outdoor units 10, and may output an operation state through a monitor screen.

The controller 50 may be connected to the plurality of indoor units 20 to perform operation setting, lock setting, schedule control, group control, peak control regarding power consumption, demand control, for example In addition, by communicating with the plurality of outdoor units 10, the controller 50 may control the plurality of outdoor units 10 and may monitor an operation of the plurality of outdoor units 10.

In the case where the controller 50 may be implemented as a plurality of controllers, the plurality of controllers 50 may transmit and receive data with each other through mutual wireless communication and may be connected to an external controller via a predetermined network. When a controller 50 and a plurality of indoor units 20 and a plurality of outdoor units 10 transmit and receive data by a wireless communication method, addresses or address information necessary for the communication may be stored in the controller 50 and each unit of the plurality of indoor and outdoor units 20 and 10. Each address may be allocated by an outdoor unit of the plurality of outdoor units 10 and the controller 50.

An outdoor unit of the plurality of outdoor units 10 may be grouped with a plurality of indoor units 20 connected thereto via a refrigerant pipe, such as first, second, or third refrigerant pipes P1, P2, or P3. In this case, addresses may be allocated to the outdoor unit of the plurality of outdoor units 10 and the plurality of indoor units 20 belonging to the same group of the outdoor unit. In addition, even though a group is set with reference to one outdoor unit in the plurality of outdoor units 10, communication may be possible between every outdoor unit of the plurality of outdoor units 10 and every indoor unit of the plurality of indoor units 20. Accordingly, the controller 50 may allocate addresses to centrally control the outdoor and indoor units 10, 20 and to provide addresses for communication on a group basis. In some cases, the controller 50 may use the addresses allocated to an outdoor unit of the plurality of outdoor units 10 and indoor units of the plurality of indoor units 20 as addresses used in the central control, without allocating additional addresses. Each unit or device of the air conditioner system, such as the outdoor units of the plurality of outdoor units 10, the indoor units of the plurality of indoor units 20, and the controller 50 may wirelessly communicate with a mobile terminal 200.

Referring to FIG. 2, the air conditioner system according to an embodiment may further include the mobile terminal 200, which is enabled or configured to check a condition of an electronic device, such as the outdoor units of the plurality of outdoor units 10, the indoor units of the plurality of indoor units 20, and the controller 50, and a condition of an electronic device in the system. The mobile terminal 200 may be provided to control the air conditioner system, and to check and control a state of the air conditioner system by executing an application provided with or installed on the mobile terminal 200. The mobile terminal 200 may be, for example, a smart phone 200a embedded with an application for the air conditioner system, a laptop 200b, or a tablet or PC 200c, for example.

Figure 3A:
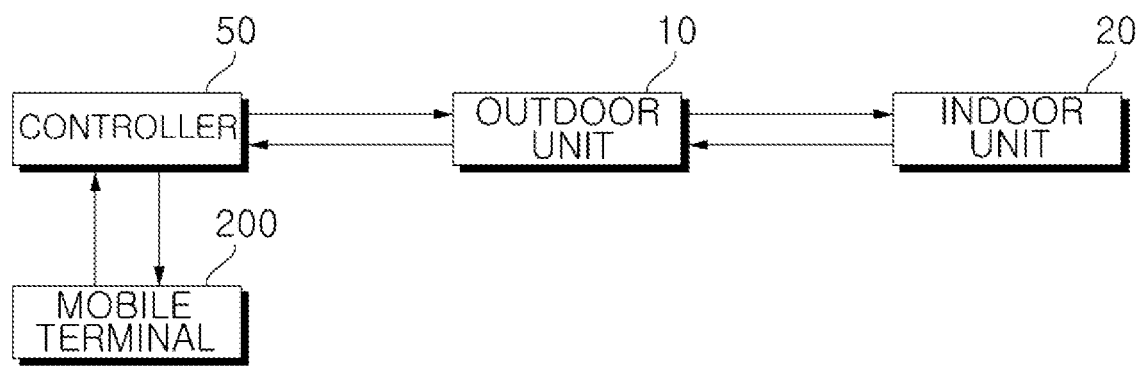
FIGS. 3A-3B are diagrams explaining communication in an air conditioner system according to an embodiment.
Figure 3B:
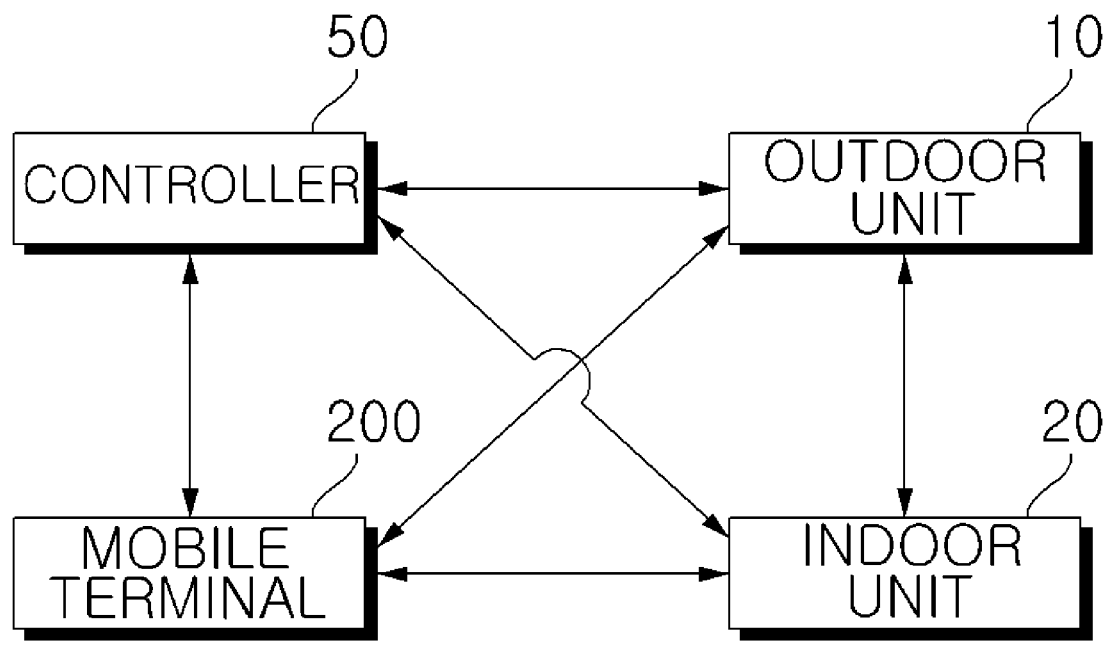

FIGS. 3A-3B are diagrams illustrating communication in an air conditioner system according to an embodiment. FIG. 3A shows communication between and among units using wired communication, and FIG. 3B shows communication between and among units using wireless communication.

Referring to FIG. 3A, a plurality of units or devices (including devices such as a controller 50, an outdoor unit or a plurality of outdoor units 10, an indoor unit or a plurality of indoor units 20, and/or a mobile terminal 200) in the air conditioner system may be connected via communication lines or wires. As there is a limitation in a connection of the communication lines, the plurality of units or devices may not be connected one by one, but may be connected in phases according to a shape or a connected shape of the communication lines.

A plurality of indoor units 20 may be connected to one outdoor unit 10, via a communication line, and the outdoor unit 10 may be connected to the controller 50. When there is a plurality of outdoor units 10, the plurality of indoor units 20 may be connected to the plurality of outdoor units 10 with reference to a connected state of a refrigerant pipe, such as first, second, and third refrigerant pipes P1, P2, or P3. The plurality of outdoor units 10 may be connected to the controller 50.

An indoor unit or a plurality of indoor units 20 may transmit data to an outdoor unit or a plurality of outdoor units 10, and an outdoor unit or the plurality of outdoor units 20 may transmit its own data and the data received from the indoor unit or the plurality of indoor units 20 to the controller 50. The controller 50 may check an operation state of the indoor unit or the plurality of indoor units 20 based on data received from the outdoor unit or the plurality of outdoor units 10.

In the case where the controller 50 transmits a control command to an indoor unit 20, the controller 50 may transmit the control command to an outdoor unit 10 connected to the indoor unit 20 and the outdoor unit 10 may transmit the received control command to the indoor unit 20. As such, when wired communication, units or devices in a plurality of units or devices may not be connected one by one (that is, each device does not connect to each and every other device in the plurality of units), so data may be transmitted in phases according to a connection state of the communication lines.

Accordingly, as data of an indoor unit 20 may not able to be transmitted directly, there may be a time delay in transmission of the data. In addition, as an outdoor unit 10 may need to process data on another unit or device, the load may be increased. Further, as one outdoor unit 10 may need to process data of a plurality of indoor units 20, it may take a long time to transmit data depending on the number of indoor units in the plurality of indoor units 20 connected to the outdoor unit 10.

In addition, even when a state of units or devices are monitored using the mobile terminal 200, data of an indoor unit 20 may not able to be transmitted directly and thus the data may be transmitted and received via the controller 50. The mobile terminal 200 may not be capable of freely communicating with each unit or device of the air conditioner system, and may need to receive, from a particular unit, only information about that particular unit and may need to communicate with the controller 50 of an upper layer in order to obtain whole information.

As shown in FIG. 3B, an outdoor unit or a plurality of outdoor units 10, an indoor unit or a plurality of indoor units 20, a controller 50, and a mobile terminal 200 may transmit and receives data with respect to each other via a wireless communication method. The controller 50 and/or the mobile terminal 200 may request data from each of the outdoor unit 10 or plurality of outdoor units 10 and the indoor unit 20, and may determine an operation state or abnormality of each unit based on data received from each of the outdoor unit 10 and the indoor unit 20. That is, each unit or device may connect to each and every other unit or device in the plurality of units.

Grouping an outdoor unit 10 and an indoor unit 20 in consideration of a flow of refrigerant has been described, but a communication channel including the controller 50, the outdoor unit 10, and the indoor unit 20 may be set separately from a communication channel between the outdoor unit 10 and the indoor unit 20. The controller 50 and/or the mobile terminal 200 may change an operation setting of the indoor unit 20 based on data received from the indoor unit 20 according to a condition (such as temperature or humidity) of an indoor space where the indoor unit 20 is installed, and may transmit data based on the change of the operation setting directly to the indoor unit 20. When the operation setting is changed, the indoor unit 20 may transmit data corresponding to the change of the operation setting to the outdoor unit 10, and so operation of the outdoor unit 10 is changed as well.

When the indoor unit 20 is scheduled to operate at a preset or predetermined time, the controller 50 may transmit an operation command to the indoor unit 20 and the outdoor unit 10 connected thereto, and the indoor unit 20 may transmit a response to the operation command to the controller 50 and transmit data on an operation state thereof at a predetermined interval or a predetermined time interval. In response to data received through an input unit or data received from the controller 50, the indoor unit 20 may set an operation and may transmits data to the outdoor unit 10. The outdoor unit 10 may control a compressor by calculating a load according to the data received from the indoor unit 20 and according to an operation state of a plurality of indoor units 20. The outdoor unit 10 and the indoor unit 20 may transmit data to the controller 50 at the predetermined time interval, and may also transmit error or abnormality-related data to the controller 50 in response to an occurrence of an error or an abnormality, regardless of a cycle.

Figure 4:
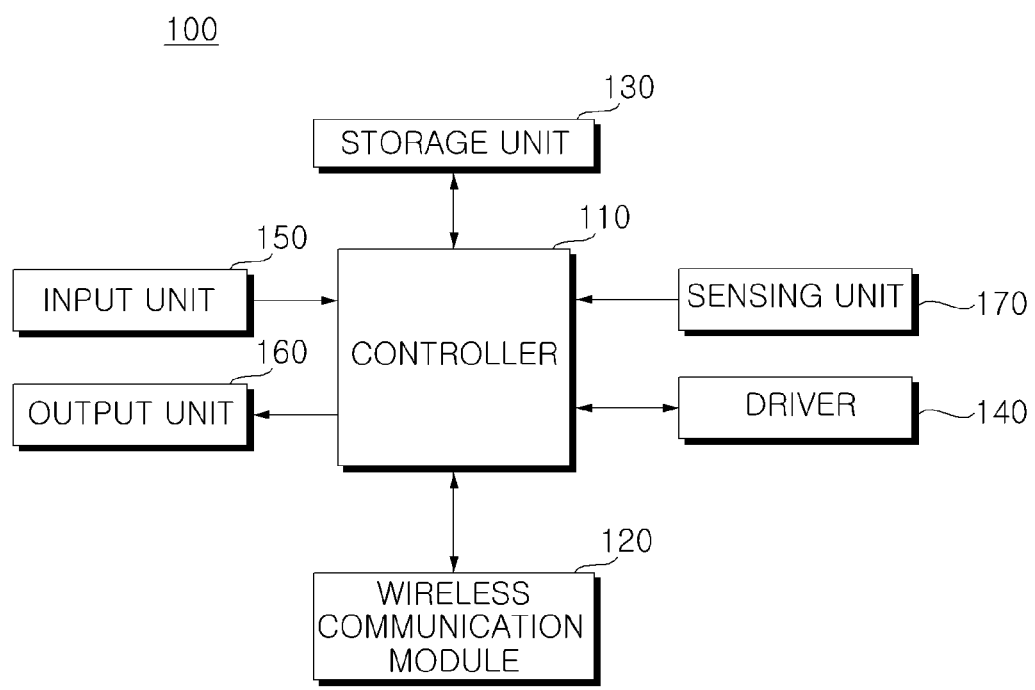
FIG. 4 is a block diagram schematically illustrating control of a configuration of units or devices in an air conditioner system according to an embodiment.

FIG. 4 is a block diagram schematically illustrating control of a configuration of units or devices in an air conditioner system according to an embodiment. The air conditioner system may include an electronic device 100. The electronic device 100 may be one of an indoor unit 20, an outdoor unit 10, a controller 50, and a wireless sensor in an air conditioner system. Referring to FIG. 4, the electronic device 100 in the air conditioner system may include a driver or drive 140, a sensing unit, sensing assembly, or sensor 170, an output unit, output, or display 160, an input unit or input 150, a storage unit, storage, or memory 130, and a controller 110 that controls an overall operation.

In addition, the electronic device 100 may be provided with a wireless communication module 120 or may be connected to the wireless communication module 120. The wireless communication module 120 may be embedded in the electronic device 100 or installed outside the electronic device 100.

An additional component may be added depending on characteristics of a product. For example, the outdoor unit 10 may include a compressor, an outdoor unit fan or outdoor fan, and a plurality of valves. Accordingly, drivers of the outdoor unit may be classified into a compressor driver, an outdoor unit fan driver or outdoor fan driver, and a valve controller or an outdoor valve controller.

The indoor unit 20 may be provided with a louver or a vane as a wind direction adjusting means, and may be provided with an indoor unit fan driver or indoor fan, a valve controller or an indoor valve controller, a wind direction controller, and a plurality of valves. In addition, a type, number, and installation positions of sensors included in the sensing assembly 170 may vary depending on a type of a unit.

The storage 130 may store control data that controls an operation of the electronic device 100, communication data that sets an address necessary to communicate with another electronic device 100 or necessary to set a group, data transmitted and received with respect to an outside of the air conditioner system, and operation data generated or sensed during an operation. The storage 130 may store an execution program of each function of the electronic device 100, data used in operation control, and transmitted and received data.

The storage 130 may be implemented in a hardware manner as a variety of storage devices such as ROM, RAM, EPROM, flash drive, and hard drive, for example. The input 150 may include at least one input means or one input interface, such as a button, a switch, and/or a touch input or touch input means. When a user command or predetermined data is input or entered via the input means or input interface, the input 150 may transmit the input data to the controller 110. The outdoor unit 10 may be provided with a test run key and an address setting key, and the indoor unit may be provided with a power key, a menu input key, an operation setting key, a temperature adjusting key, a wind power key, or a lock key, for example.

The output unit 160 may include at least one of a lamp or light which is controlled to be turned on or blink, an audio output unit or audio output provided with a speaker to output or play predetermined sound, or a display so as to output an operation state of the electronic device 100. The light indicates whether the electronic device 100 is in operation depending on whether the light is turned on, the color of the light emitted, or whether the light is blinking, and the speaker may output an operation state via a predetermined alarm sound or effect sound. The display may output a menu screen to control the electronic device 100, and may also output a guidance message or an alarm related to an operation setting or an operation state of the electronic device 100, wherein the guidance message or the alarm is composed of a combination of at least one of a text, a number, or an image.

The sensing assembly 170 may include a plurality of sensors. The sensing assembly 170 may include a pressure sensor, a temperature sensor, a gas sensor, a humidity sensor, and/or a flow sensor. For example, a plurality of temperature sensors may be provided to sense an indoor temperature, an outdoor temperature, a temperature of an indoor heat-exchanger, a temperature of an outdoor heat-exchanger, and/or a pipe temperature, and the plurality of temperature sensors may input sensed values to the controller 110. The pressure sensor may be installed at an inlet port or inlet and an outlet port or outlet of a refrigerant pipe, may measure pressure of flowing refrigerant and pressure of discharged refrigerant, and may input measurements or sensed data to the controller 110. The pressure sensor may be installed not just in the refrigerant pipe, but also in a water pipe.

The driver 140 may supply a power or an operation power to a control target in accordance with a control command of the controller 110, and may control a driving of the control target. As described above, when an outdoor unit, the driver 140 may be provided as a compressor driver, an outdoor unit fan or outdoor fan driver, and/or a value controller that controls a compressor, an outdoor fan, and a valve, respectively. The driver 140 may apply the operation power to motors provided in the compressor, the outdoor fan, and the valve, for example, so that preset operations may be performed upon operation of the motors.

The wireless communication module 120 may support at least one or more wireless communication methods, and may communicate with another unit or another device in accordance with a control command of the controller 110. The wireless communication module 120 may transmit and receive data in a wireless communication method set between the controller 110, the outdoor unit 10, and the indoor unit 20, and may transmit received data to the controller.

The wireless communication module 120 may set an address for communication between units, may transform data to be transmitted and received, and may process a signal. Upon operation of the electronic device 100, the wireless communication module 120 may search for another unit or another electronic device in the same frequency band through wireless communication, and may check or verify connection to that unit. The wireless communication module 120 may communicate by allocating a temporary address for an initial operation or by setting a received temporary address. When setting an address in response to a control command of the controller 110, the wireless communication module 120 may request a product number from the controller 110 and set an address based on the product number. The product number may be a unique number, a serial number, a Media Access Control (MAC) address, or the like of that other unit.

The controller 110 may control data to be input and output through the input 150 and the output 160, may manage data stored in the storage 130, and may control a transmission and a reception of data through the wireless communication module 120. The controller 110 may sense a connection state and a communication state of the wireless communication module 120 through a connection unit, and may determine an error.

The controller 110 may generate a control command to operate in accordance with a request from another unit, another electronic device, or a set operation setting, and may transmit the control command to the driver 140. Accordingly, the driver 140 may control a component connected thereto; for example, a compressor, an output unit fan or output fan, a valve, an indoor fan, and/or a wind direction adjusting means, vane, or louver to operate.

While the electronic device 100 is in operation, the controller 110 may determine an operation state of the electronic device 100 based on data received from a plurality of sensors of the sensing unit 170, and may output an error. The wireless communication module 120 may be provided inside the electronic device 100 or may be connected to the electronic device 100 via a connection unit. The wireless communication module 120 may receive data of the electronic device 100 via the connection unit, and may transmit received data to the electronic device 100.

The wireless communication module 120 may wirelessly communicate using a sub-GHz frequency band so that communication is enabled despite the presence of a wall, a floor, or an obstacle, for example, in a building. The sub-GHz frequency band has excellent transmission and rotation characteristics, and thus may be less attenuated in response to a wall or an inter-floor object. Thus, the wireless communication module 120 may be efficiently communicate within an air conditioner system provided with a plurality of units in a building partitioned by walls.

The wireless communication module 120 may communicate using one of 400 MHz or 900 MHz, which are unlicensed bands available for a lower power wireless station in Sub-GHZ bands. The wireless communication module 120 may selectively use 400 MHz and/or 900 MHz in response to a standard which is different depending on a region or country. In addition, the wireless communication module 120 may further include a Zigbee module, a Bluetooth module, an NFC module, and any other communication module which is or includes a short-range communication technology.

The wireless communication module 120 may include a plurality of communication modules, so the same communication module or different communication modules may be used in communication between an outdoor unit 10 and another indoor unit 20, communication with a remote controller, and/or communication with the controller 110. The wireless communication module 120 may communicate via a different communication method according to a target to communicate, by selectively changing the communication method in response to the target to communicate.

When different channels are used in communication with an indoor unit 20 and communication with a controller 110, the wireless communication module 120 may transmit and receive data by setting a different channel according to a target to communicate. According to the Korean radio wave act, over a frequency band of 400 MHz or 900 MHx, there are 21 channels between 424.7 MHz and 424.95 MHz and 11 channels between 447.8625 MHz and 447.9875 MHz for radio equipment of a predetermined low-power wireless station used for data transmission, and 32 channels between 917 MHz and 923.5 MHz for radio equipment of RFID/USN. Thus, communication may be performed using the above channels.

Unlicensed frequency bands used in countries are as below: 902-928 MHz (FCC Part 15.247) in North and South America; 433 MHz, 915 MHz, and 863-868 MHz (ETSIEN300220) in Europe; 920-928 MHz (ARIB STD-T108) in Japan; 920 MHz in China; 424-447 MHz and 917-923.5 MHz (KC) in South Korea; 865-867 MHz (G.S.R 564(E)) in India; 433 MHZ and 915 MHZ in Australia; and 433 MHz in South Africa. Across the world, 2.4 GHz and 5.72 GHz are commonly available. In addition, if 902-928 MHz is used in North and South America, 863-868 MHz in Europe, 920-928 MHz in Japan, 917-923.5 MHz in South Korea, 865-867 MHz in India, and 2.74 GHz/5.72 GHz commonly across the word, communication may be possible at 50 kbps or faster.

As an obstacle such as a wall between floors and furniture may exist in a building, a frequency band which allows signal to pass through such an obstacle and reach a predetermined distance or more may be used. The Industrial, Scientific and Medical (ISM) band (100 MHz, 20 MHz, 400 MHz, 900 MHz) in Sub-GHz bands has an excellent penetration ability in a building and thus enables inter-floor communication. A length of an antenna may depend on a transmitting frequency band, and, since 100 MHz and 200 MHz requires a long antenna length, there may be a restriction in antenna installation. Therefore, the wireless communication module 120 may be configured to communicate using a frequency band of 400 MHz or 900 MHz out of the aforementioned frequency bands.

Figure 5:
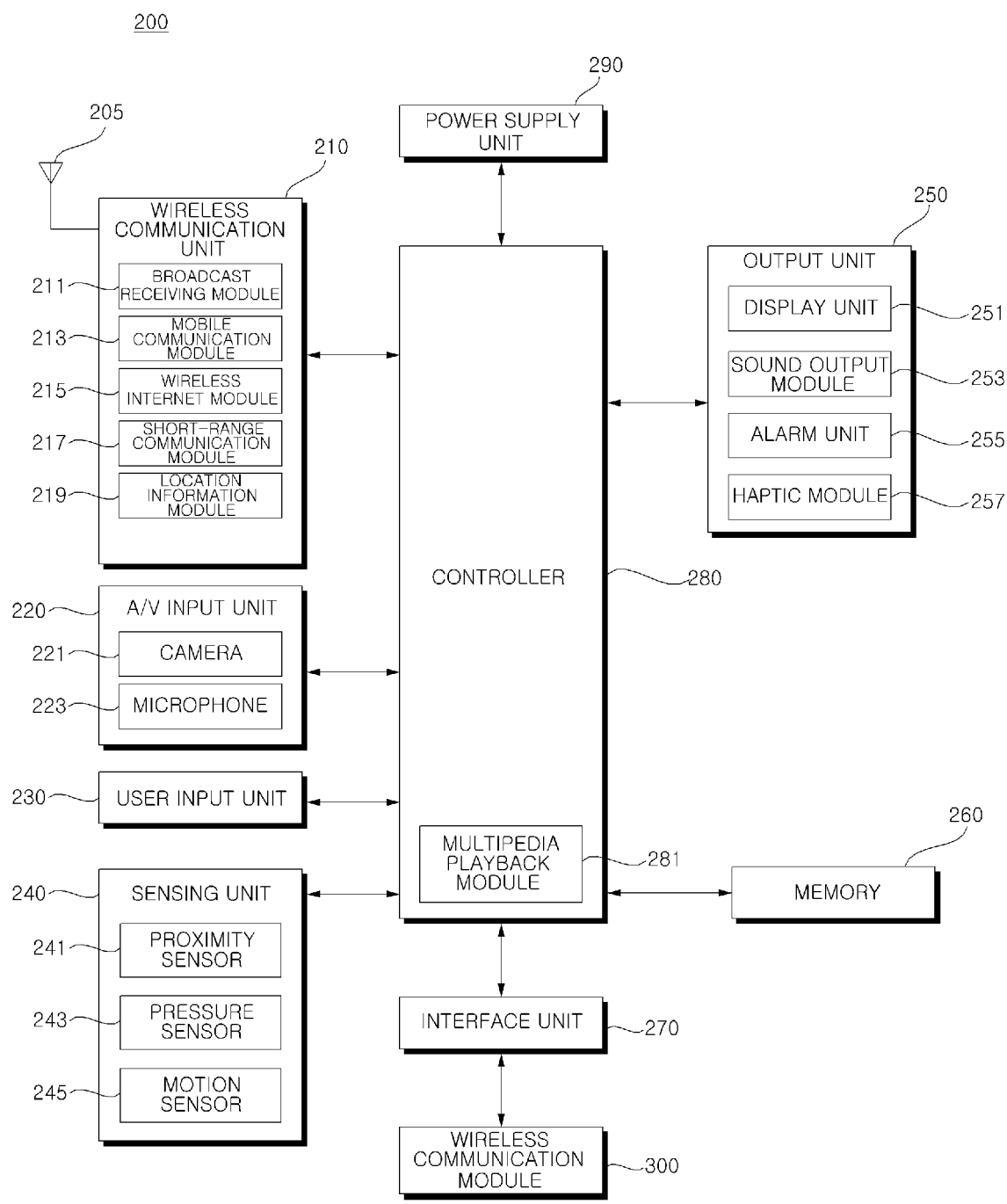
FIG. 5 is an inner block diagram schematically illustrating a mobile terminal according to an embodiment.

FIG. 5 is an inner block diagram schematically illustrating a mobile terminal according to an embodiment. Referring to FIG. 5, a mobile terminal 200 may include a wireless communication unit or a wireless communication assembly 210, an Audio/video (A/V) input unit or an A/V input 220, a user input unit or user input 230, a sensing unit or sensor 240, an output unit or output 250, a memory or storage 260, an interface unit or interface 270, a controller 280, and a power supply unit or power supply 290.

The mobile terminal 200 according an embodiment may include a wireless communication module 300 that wirelessly communicates with a plurality of electronic devices or an electronic device 100. The wireless communication module 300 may be configured as one block of the wireless communication assembly 210.

The wireless communication module 300, which supports wireless communication in a sub-GHz band, may be used to wireless communicate with each electronic device 100 included in the air conditioner system using a sub-GHz band. Not all of the common mobile terminals 200 may be embedded with the wireless communication module 300 supporting sub-GHz band wireless communication, so a dedicated wireless communication module 300 may be used to create a connection.

The wireless communication module 300 may be connected via the interface 270 or via the wireless communication assembly 210. The wireless communication assembly 210 may include a broadcast receiving module or broadcast receiver 211, a mobile communication module 213, a wireless internet module 215, a short-range communication module 217, and a location information module or location module such as a Global Position System (GPS) module 219.

The broadcast receiver 211 may receive at least one of a broadcast signal or broadcast-related information from an external broadcast management server via a broadcast channel. The broadcast channel may include a satellite channel or a terrestrial channel, for example. The broadcast signal and/or the broadcast-related information received through the broadcast receiver 211 may be stored in the memory 260.

The mobile communication module 213 may transmit and receive a radio signal with respect to at least one of a base station, an external terminal, or a server on a mobile communication network. The radio signal may include a voice call signal, a video call signal, and/or various types of data according to transmission and reception of text and/or multimedia message.

The wireless internet module 215 may refer to a module or device that enables or allows wireless Internet access. The wireless internet module 215 may be embedded in or may be external to the mobile terminal 200. For example, the wireless internet module 215 may perform a Wi-Fi-based wireless communication or a Wi-Fi Direct-based wireless communication.

The short-range communication module 217 may refer to a module that enables or allows a local area communication, and that may support short-range communication using at least one of the following: Bluetooth™, Radio Frequency Identification (RFID), Infrared Data Association (IrDA), Ultra Wideband (UWB), and ZigBee. The short-range communication module 217 may support wireless communication between the mobile terminal 200 and a wireless communication system, wireless communication between the mobile terminal 200 and another mobile terminal 200, wireless communication between the mobile terminal and a different mobile terminal, or wireless communication between the mobile terminal 200 and a network in which an external server is located via short-range wireless area networks.

The GPS or location module 219 may receive position information from a plurality of GPS satellites. The wireless communication assembly 210 may exchange data with a server using one or more communication modules. The wireless communication assembly 210 may include an antenna 205 allowing wireless communication, and may include an antenna that receives a broadcast signal in addition to an antenna that makes a call.

The A/V input 220 may be related to or may receive an audio signal or a video signal, and may include a camera 221 and a microphone 223. The user input 230 may generate key input data that is input by a user to control an operation of the mobile terminal 200. The user input 230 may be in the form of a key pad, a dome switch, or a touch pad (static pressure/electrostatic), for example. In particular, if a touch pad forms an inter-layered structure with a display unit or display 251, the structure may refer to a touch screen.

The sensing assembly 240 may generate a sensing signal that controls the operation of the mobile terminal 200. The sensing assembly 250 may sense a current state of the mobile terminal 200; for example, the sensing assembly 250 may sense an opened/closed state of the mobile terminal 200, a position of the mobile terminal 200, and/or a user's contact.

The sensing assembly 240 may include a proximity sensor 241, a pressure sensor 243, and a motion sensor 245, for example. The motion sensor 245 may sense movement or a position of the mobile terminal 200 using an accelerometer, a gyro sensor, or a gravity sensor, for example. In particular, the gyro sensor may be a sensor that measures an angular velocity. The gyro sensor may be able to sense a direction or an angle of rotation against a reference direction.

The output 250 may include the display 251, a sound output module or a speaker 253, an alarm unit or alarm 255, or a haptic module or kinesthetic communication module 257, for example. The display 251 may present or display information processed in the mobile terminal 200. When the display 251 forms an inter-layered structure with a touch pad to implement a touch screen, the display 251 may be used as both an output device and an input device to which information may be input by a user's touch. The speaker or sound output module 253 may output audio data received from the wireless communication assembly 210 or stored in the memory 260. The sound output module 253 may include a speaker or a buzzer, for example.

The alarm 255 may output a signal that notifies occurrence of an event in the mobile terminal 200. For example, the alarm 255 may output a signal in the form of vibration, or the alarm 255 may output a signal that controls the haptic module 257 to generate a tactile effect. The haptic module 257 may generate various tactile effects that a user can feel, such as vibrations. The memory 260 may store a program that processes and controls the controller 280, or may temporarily store input and output data (for example, a phone book, messages, still images, or videos).

The interface 270 may serve or act as a channel with all external devices connected to the mobile terminal 200. The interface 270 may receive data or power from an external device and transfers the received data or power to each element, unit, or device of the mobile terminal 200 or allow internal data of the mobile terminal 200 to be transmitted to an external device.

The controller 280 may control an overall operation of the mobile terminal 200 by controlling operations of each of the aforementioned elements, units, or devices of the mobile terminal 200. For example, the controller 280 may control or process a voice call, data communication, and a video call. In addition, the controller 280 may be provided with a multimedia playback module or a multimedia player 281 that plays multimedia. The multimedia player 281 may be implemented in a hardware form inside the controller 280, or may be implemented in a software form separately from the controller 280. The power supply 290 may receive external and internal power under a control of the controller 280, and may supply power necessary to operate each element, unit, or device of the mobile terminal 200.

Depending on specifications of the mobile terminal 200 in actual implementation, each constituent element, unit, or device of the mobile terminal in the block diagram of FIG. 5 may be combined or omitted, or a new element may be added. Two or more components may be combined into one element, unit, or device, or one component or one element may be divided into two or more components or two or more elements, as needed. In addition, the function of each block is described for the purpose of describing an exemplary embodiment and thus specific operations or devices should not be construed as limiting the scope and spirit of embodiments disclosed herein.

Figure 6:
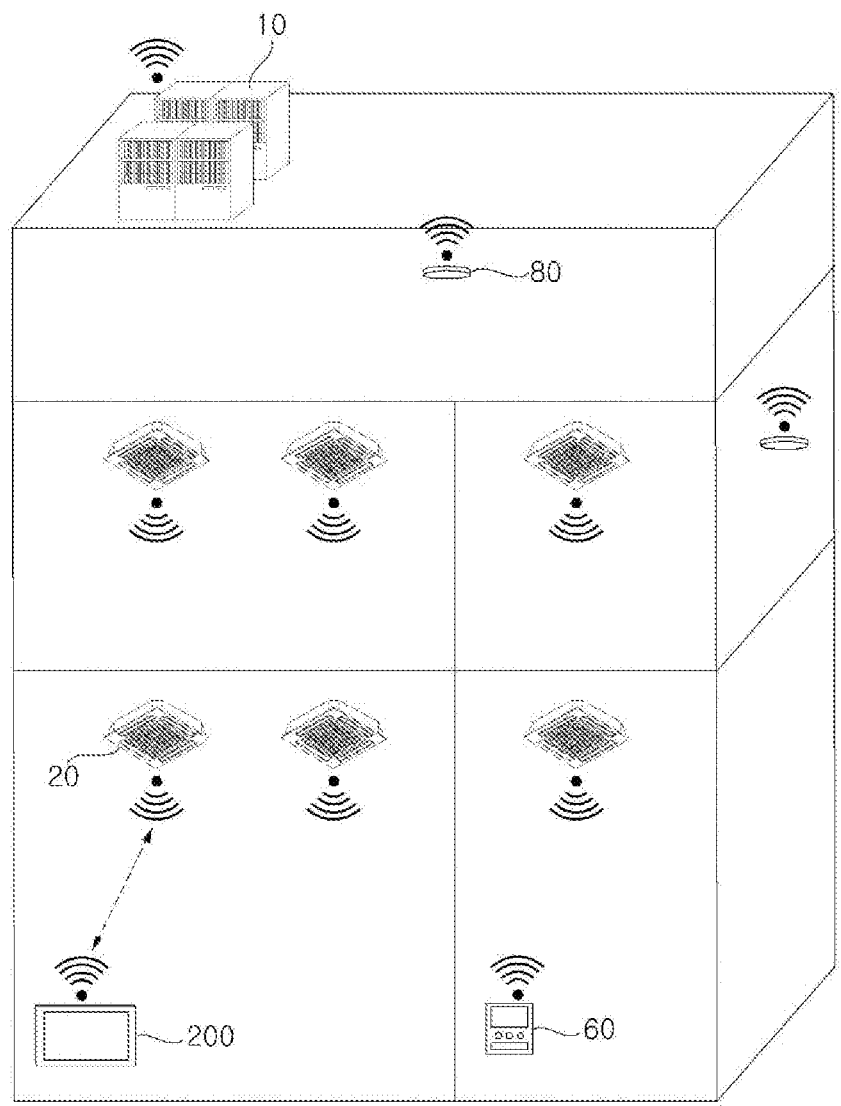
FIG. 6 is a diagram explaining an air conditioner system according to an embodiment.

FIG. 6 is a diagram illustrating an air conditioner system according to an embodiment. Referring to FIG. 6, the air conditioner system may include an indoor unit 20, an outdoor unit 10, a remote controller 60, a wireless sensor 80, and a mobile terminal 200. The air conditioner system may further include a controller, a ventilator, a defroster, a humidifier, or a heater, for example.

The remote controller 60 may be connected to the indoor unit 20 or the outdoor unit 10 in a wired manner or in a wireless manner. As described above with reference to FIGS. 1 to 5, the mobile terminal 200 and the controller 50 (see FIG. 1) may be wirelessly connected to units such as the indoor unit 20 and the outdoor unit 10, and may control each of the units. The indoor unit 20 may include a plurality of indoor units, and the outdoor unit 10 may include a plurality of outdoor units. The mobile terminal 200 and the controller 50 may control each of the indoor and outdoor units 10 or 20.

In response to a request for data information from the mobile terminal 200 or the controller 50, the indoor unit 20 and the outdoor unit 10 may transmit the requested data information. Depending on the request from the mobile terminal 200 or the controller 50, the indoor unit 20 and the outdoor unit 10 may transmit data information with different content.

The indoor unit 20 and the outdoor unit 10 may receive a control signal from the mobile terminal 200 and the controller 50. When receiving the control signal from the mobile terminal 200 or the controller 50, the indoor unit 20 and the outdoor unit 10 may report reception of the control signal to the mobile terminal 200 or the controller 50, but aspects of embodiments disclosed herein are not limited thereto and the above process may vary depending on a communication method adapted by the air conditioner system.

When receiving the control signal, the indoor unit 20 and the outdoor unit 10 may perform an operation corresponding to the control signal. The indoor unit 20 and the outdoor unit 10 may receive, from the mobile terminal 200 or the controller 50, a storage cycle or a storage time to store a data signal or data information including an operation state. The indoor unit 20 and the outdoor unit 10 may store data information periodically or in response to occurrence of an error.

When an error occurs, the indoor unit 20 and the outdoor unit 10 may extend the storage time of the recently stored data information. Each of the indoor unit 20 and the outdoor unit 10 may include a storage medium or memory that stores the data information. For example, the indoor unit 20 and the outdoor unit 10 may periodically receive data information and may store, in response to occurrence of an error, the recently stored data information in a way that distinguishes the recently stored data information from other information or data information, but aspects of the embodiments disclosed herein are not limited thereto.

The data information may include an operation state of the indoor unit 20 or the outdoor unit 10. For example, the data information may include air temperature, compression temperature, evaporation temperature, discharge temperature, or heat-exchanger temperature, for example, but aspects of embodiments disclosed herein are not limited thereto and the data information may include a broad range of information related to operation of the indoor unit 20 or the outdoor unit 10.

The indoor unit 20 or the outdoor unit 10 may transmit data information including the operation state to the mobile terminal 200 or the controller 50. When an on/off state or the operation state of the indoor unit 20 or the outdoor unit 10 is changed or when an error occurs, the indoor unit 20 or the outdoor unit 10 may transmit corresponding data information to the mobile terminal 200 or the controller 50. The indoor unit 20 or the outdoor unit 10 may communicate with the mobile terminal 200 or the controller 50 in a predetermined period or a predetermined time period in response to occurrence of an event. The mobile terminal 200 or the controller 50 may receive in real time detailed cycle data, which allows error analysis of each unit (or each of the indoor or outdoor units 20, 10), and may display the received data on a screen.

When the mobile terminal 200 or the controller 50 displays data information in a test form such as numbers, data information of the indoor unit 20, data information of the outdoor unit 10, and valve information of a pipe connecting the indoor unit 20 and the outdoor unit 10 may be displayed. In some implementations, when displaying the valve information, the mobile terminal 200 or the controller 50 may display opening or closing, an opened/closed status, or an on/off status of a valve in the form of color or a picture. For example, the mobile terminal 200 or the controller 50 may display or indicate an opened valve in blue and a closed valve in gray, or may display a picture of an opened valve and/or a picture of a closed valve, but aspects of embodiments disclosed herein are not limited to the aforementioned color or types of pictures.

When displaying data information in the form of a time series image, the mobile terminal 200 or the controller 50 may select an outdoor unit 10 or an indoor unit 20 to display. When selecting one outdoor unit 10 from among a plurality of outdoor units 10, the mobile terminal 200 or the controller 50 may select one indoor unit 20 to check from among a plurality of indoor units 20 connected to the selected outdoor unit 10.

When the outdoor unit 10 and the indoor unit 20 are selected, the mobile terminal 200 or the controller 50 may receive data information, which may include an operation state of the selected indoor unit 20 and a connection state between the selected outdoor unit 10 and the selected indoor unit 20. The connection state may include a connection state of a pipe, a flow inside the pipe, or an on/off state or an opened/closed state of the valve, for example, but aspects of embodiments disclosed herein are not limited thereto.

The mobile terminal 200 or the controller 50 may display an operation state of the selected outdoor unit 10 and the selected indoor unit 20 in a time-series manner in the form of a change of a picture or change of color. The mobile terminal 200 or the controller 50 may display a state of a pipe connecting the selected outdoor unit 10 and the selected indoor unit 20, and an on/off state of a valve.

The mobile terminal 200 or the controller 50 may check in real time an operation state of the indoor unit 20 or the outdoor unit 10. When checking the operation state of the indoor unit 20 or the outdoor unit 10 in real time, the mobile terminal 200 or the controller 50 may receive data information in real time and display the received data information. The wireless sensor 80 may sense an air condition or a condition of the air, and may transmit air condition data corresponding to the sensed air condition.

The air condition may be a condition of the air based on at least one of temperature, humidity, pressure, an amount of dust, an amount of carbon dioxide, or an amount of oxygen. Accordingly, the wireless sensor 80 may measure at least one of temperature, humidity, pressure, an amount of dust, an amount of carbon dioxide, or an amount of oxygen. The air condition data may include data on at least one of temperature, humidity, pressure, an amount of dust, an amount of carbon dioxide, or an amount of oxygen.

The wireless sensor 80 may transmit the air condition data in a broadcast manner. The broadcast manner may be a method of transmitting data without specifying a recipient. By transmitting air condition data to a predetermined communication network without specifying a recipient, the wireless sensor 80 may save energy, operations, and components necessary to set a recipient of the data.

The air condition data broadcast by the wireless sensor 80 may be transferred to the outdoor unit 10 or the indoor unit 20. The air condition data broadcast by the wireless sensor 80 may be transferred to the controller 50 or the mobile terminal 200. The indoor unit 20 or the outdoor unit 10 may perform an appropriate air conditioning operation based on the received air condition data. The indoor unit 20 or the outdoor unit 10 may operate in accordance with a control signal received from the controller 50 or the mobile terminal 200.

As shown in FIG. 6, when units such as indoor units 20 and outdoor units 10 are wirelessly connected in the air conditioner system, installation costs and time may be reduced, compared to when the units are connected in a wired manner. It is possible to check information of any one unit of the indoor and outdoor units 20, 10 and control the corresponding unit via direct communication with the corresponding unit without passing through a particular unit, such as the controller 50. Communication time may therefore be reduced, making use more convenient.

In some cases, such as a building and apartment where many units are wirelessly connected, it may be possible to check and control information. However, as the number of wirelessly connected units and/or devices increases, communication quality may suffer unless an optimal communication channel is configured to reduce communication speed and interferences. In addition, the quality of communication may change according to a change in a communication environment or an environment where the devices and/or units communicate. For example, the environment may change when a number of devices using wireless communication increase, which may result in a reduction in communication speed and increased interference, even in a communication channel which was initially smooth or unimpeded before the change.

Thus, there is need of a method of allowing wirelessly connected units or devices to automatically set an optimal communication channel, and a method of dynamically changing a communication channel while in use to adapt to a changing communication environment.

Figure 7:
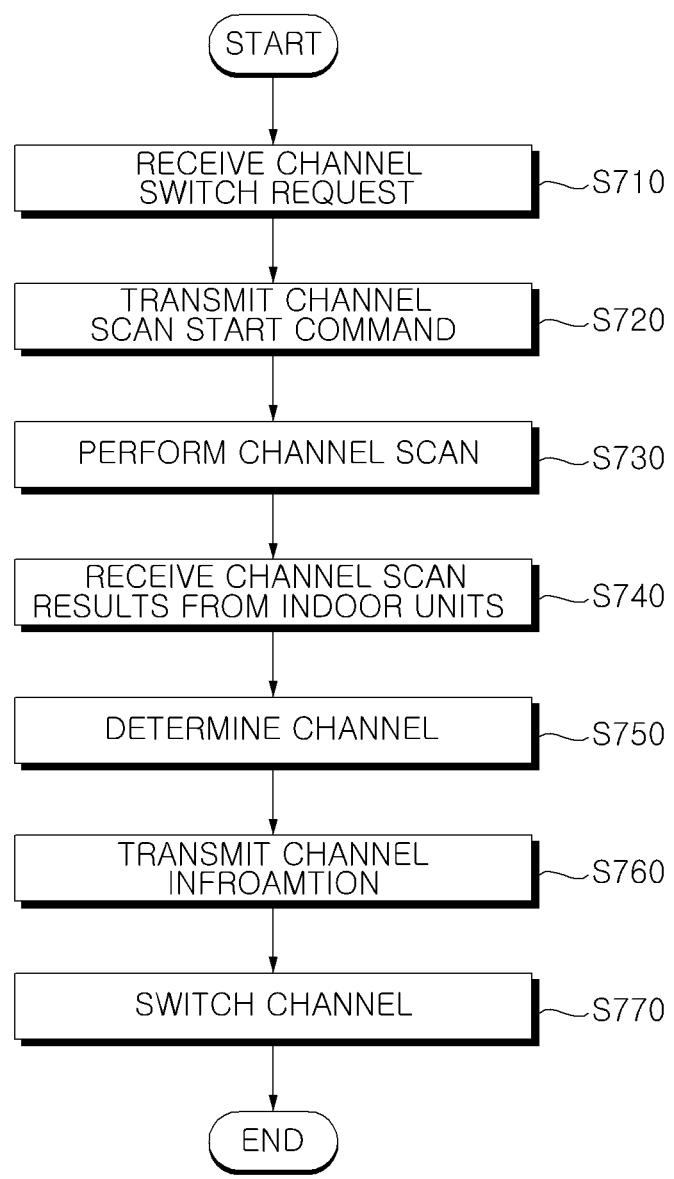
FIG. 7 is a flowchart illustrating a method for controlling an outdoor unit according to an embodiment.

FIG. 7 is a flowchart illustrating a method for controlling an outdoor unit according to an embodiment. Referring to FIG. 7, the outdoor unit 10 (see FIG. 1) may receive a channel switch signal or a channel switch request from one or more of the plurality of indoor units 20 (see FIG. 1) in S710.

The outdoor unit 10 may be grouped with a plurality of indoor units 20 (see FIG. 1), and the outdoor unit 10 and the plurality of indoor units 20 in the same group may periodically exchange a signal with each other in response to occurrence of an event. In addition, the outdoor unit 10 and the plurality of the indoor units 20 in the same group may be controlled as a group.

The outdoor unit 10 and the plurality of indoor units 20 may wirelessly communicate using a sub-GHz frequency band. Each wireless communication module 120 of the outdoor unit 10 and the plurality of indoor units 20 may wirelessly communicate with each other or units or devices of the air conditioner system using a sub-GHZ frequency band under the control of the controller 110.

The sub-GHz frequency band has excellent transmission and rotation characteristics and thus is less attenuated in the presence of a wall or an inter-floor obstacle. Therefore, the sub-GHz frequency band may be used in the communication of the air conditioner system in which a plurality of units are positioned in multiple floors in a building partitioned by walls.

While the outdoor unit 10 and the plurality of indoor units 20 operate, a reception rate may be reduced due to an increased number of devices or units using wireless communication in an environment where each unit or device is installed, which may increase a communication load. The reception rate may also be reduced due to an addition of a wall or any other obstacle.

If the reception rate is reduced by a preset reception rate degradation error or reduced by a preset rate change, a preset rate error, or a preset reception error, one or more indoor units of the plurality of indoor units 20 belonging to a particular group may transmit a channel switch request signal to an outdoor unit 10 belonging to the same group. The preset reception error may include or occur when a buffer overflow occurring three times or more within the past one hour or a checksum error occurring at 10% or more within the recent one hour, for example.

If another device using the same communication channel or an adjacent communication channel is additionally installed within a predetermined range or a predetermined distance from a position of an indoor unit in the plurality of indoor units 20, or if a data throughput of another device using the same communication channel or an adjacent communication channel is remarkably increased, an amount of data to be received by the indoor unit 20 may be increased. If the amount of data is increased by more than a predetermined level or a predetermined amount, the indoor unit 20 may not be able to process received data and thus a buffer overflow may occur. If a buffer overflow occurs a predetermined number of times or more within a predetermined period of time, it may be determined that a reception rate degradation error or a reception error has occurred.

Using a checksum is widely known as a method of detecting an error from packet data transmitted and received in a wireless communication environment. If a checksum error occurs at a predetermined level or more within a predetermined period of time, it may be determined that a reception error has occurred. In a similar manner, a reception error may be determined to be a Cyclic Redundancy Check (CRC) error.

To allow a dynamic channel switch, the outdoor unit 10 may transmit a channel scan start command to the plurality of indoor units 20 belonging to the same group in S720. The outdoor unit 10 may perform a channel scan to check whether a channel or a communication channel is being used and to measure a communication load of the channel in S730. The channel scan may be performed on a plurality of channels or pre-set channels which are set in a predetermined range of frequencies in a sub-GHz band. For example, the channel scan may be performed on 20 channels which are preset in a sub-GHz band.

A variety of modification methods such as Frequency Shift Keying (FSK), Gaussian Frequency Shift Keying (GFSK), Offset Quadriphase Shift Keying or Offset Quadrature Phase Shift Keying (OQPSK), Pre-Shared Keying or Phase Shift Keying (PSK), and Orthogonal Frequency Division Multiplexing (OFDM) may be used in wireless communications. If a channel scan is performed using every modification method, a channel scan time may be dramatically increased in proportion to the number of channels and the number of modification methods in use. Thus, the outdoor unit 10 may check an amount of or measure the communication load of a plurality of channels in an energy detection method, thereby reducing a channel scan time.

The outdoor unit 10 may scan all channels, and, depending on whether energy is detected in a channel during the scanning, determine whether the corresponding channel is being used. In some implementations, when energy equal to or greater than a predetermined energy value is detected, the outdoor unit 10 may determine that a corresponding channel is being used.

The outdoor unit 10 may repeatedly scan all channels a predetermined number of times, and decide an amount of communication load based on energy detected through the repeated scanning. The outdoor unit 10 may decide an amount or size of the communication load based on the amount or size of detected energy.

According to an embodiment, a channel use amount may be decided, not by checking the channel use amount on the basis of each channel by each modulation method, but instead by checking the channel use amount on the basis of channel idleness regardless of a type of wireless modulation method. For example, it is possible to measure a communication load in an energy detection method for a predetermined time period, regardless of a modulation method, and to automatically set a communication channel when a channel for use is determined. By performing a wireless channel scan in sub-GHz band, it may be possible to check an amount of the communication load and the use of each channel.

The outdoor unit 10 may receive the results of performed channel scans from a plurality of indoor units 20 belonging to the same group in S740. The plurality of indoor units 20 belonging to the same group that receive the channel scan command from the outdoor unit 10 may also perform a channel scan in the same way the outdoor unit 10 performs a channel scan, and transmit the channel scan results to the outdoor unit 10. Each indoor unit in the plurality of indoor units 20 may scan each channel, or alternatively may scan a plurality of channels such that every channel is scanned by at least one indoor unit in the plurality of indoor units 20. FIG. 11A exemplifies a compilation of scan results.

Based on a result of the performed channel scan by the outdoor unit 10 and the channel scan results received from the plurality of indoor units 20, the outdoor unit 10 may determine a channel to use in the corresponding group in S750. The plurality of indoor units 20 may be provided in different layers and in different spaces. Thus, a communication environment may vary depending on positions of the plurality of indoor units 20.

A channel for use may be determined not on the basis of a result of a channel scan performed by a predetermined device alone, but on the basis of aggregated results of channel scans performed by both the outdoor unit 10 and the plurality of indoor units 20, individually. A channel scan may be performed by all units belonging to a group; that is, a channel scan may be performed by the outdoor unit 10 and each of the indoor units of the plurality of indoor units 20 belonging to the same group. The outdoor unit 10 may aggregate results of the channel scans received from all units of the group. The outdoor unit 10 may analyze a channel difference at each position by aggregating the channel scan results, and may determine that a channel not being used or having the smallest amount of communication load is a channel to be used.

The channel scan results may include load occupancy rates, and the outdoor unit 10 may use the highest load occupancy rate of each channel in the aggregate channel scan results as a representative load occupancy rate of a corresponding channel. That is, the "worst" or highest result among the results for a particular channel by all units may be used as a representative value of a use amount of each channel. For example, in FIG. 11A, the representative value of a use amount of channel 1 (CH01) would be 40%.

If there is only one channel whose load occupancy rate is 0%, the outdoor unit 10 may determine that the channel whose load occupancy rate is 0% is a channel to be used. If there is a plurality of channels having a load occupancy rate of 0%, the outdoor unit 10 may determine that a channel with an adjacent channel having the lowest load occupancy rate among the plurality of channels having the load occupancy rate of 0% is a channel to be used. If there is a plurality of channels having a load occupancy rate of 0%, the outdoor unit 10 may determine that a channel having an adjacent channel with the greatest difference in the measured load occupancy rates from among the plurality of channels having the load occupancy rate of 0% is a channel to be used.

Interference may occur between channels and adjacent channels thereof. Thus, if there is a plurality of channels having a load occupancy rate of 0%, a channel with an adjacent channel having a low load occupancy rate may be used in order to minimize interference.

If there is no channel having a load occupancy rate of 0%, the outdoor unit 10 may determine that a channel having the lowest load occupancy rate is a channel to be used. That is, the outdoor unit 10 may use a channel which currently has the lowest communication load. Alternatively, if there is no channel having a load occupancy rate of 0%, the outdoor unit 10 may determine that a channel having the lowest load occupancy rate due to other devices not included in the air conditioner system is a channel to be used.

Communication load between units included in the air conditioner system may be easy to expect and manage, compared to communication load between units over different wireless communication such as in a heterogeneous network. Thus, if there is no channel having a load occupancy rate of 0%, a channel having the lowest load occupancy rate by a heterogeneous network may be determined to be a channel to be used.

Even in the case where there is no channel having a load occupancy rate of 0%, the outdoor unit 10 may determine that a channel whose adjacent channel has the lowest load occupancy rate is a channel to be used. If there is a plurality of channels with respective adjacent channels having the lowest load occupancy rate or similarly low load occupancy rates, the outdoor unit 10 may determine that a channel having the greatest absolute value of signal strength is a channel to be used.

When there is no channel having the load occupancy rate of 0%, the outdoor unit 10 may determine that a channel with an adjacent channel having the greatest difference in the measured load occupancy rate is a channel to be used. The outdoor unit 10 may output information of the determined channel, that is, the channel determined to be used, to the plurality of indoor units 20 in S760. The information of the determined channel may include a command that instructs setting or switching to the determined channel as a communication channel.

The wireless communication module 120 of the outdoor unit 10 may broadcast a signal including the information of the determined channel a predetermined number of times, and the respective wireless communication modules 120 of the plurality of indoor units 20 may receive the broadcasted signal.

The outdoor unit 10 may switch to or set the determined channel as a communication channel in S770.

Figure 8:
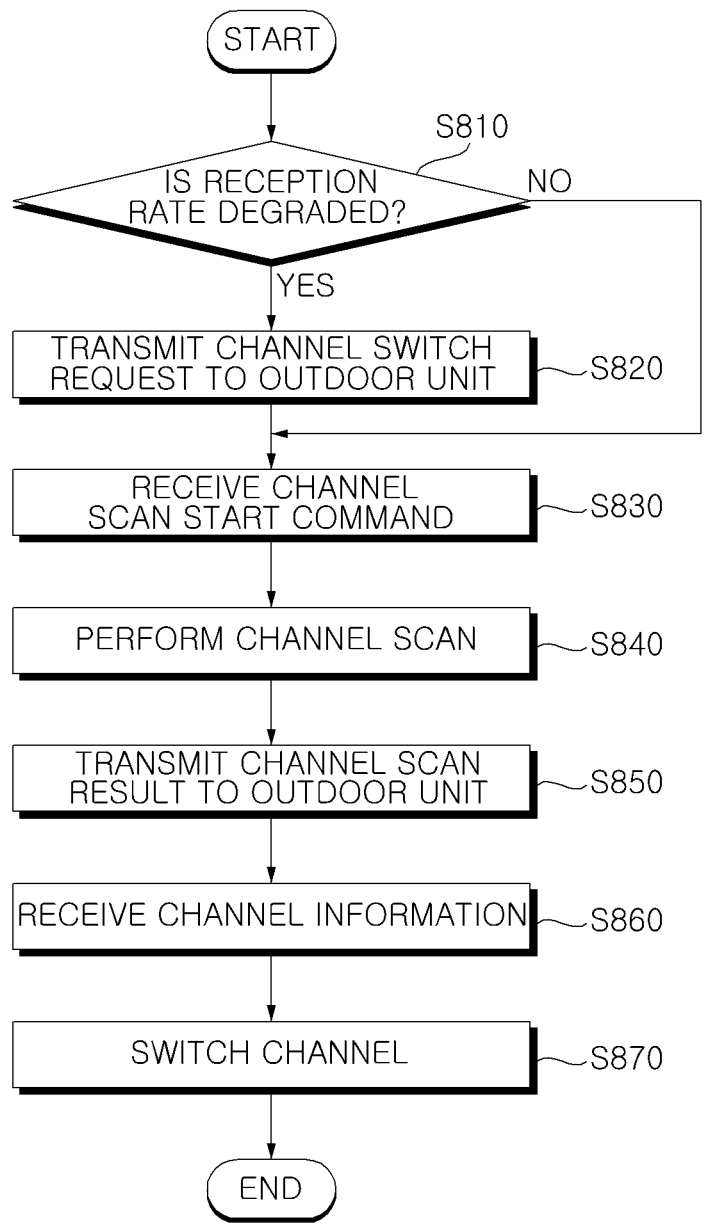
FIG. 8 is a flowchart illustrating a method for controlling an indoor unit according to an embodiment.

FIG. 8 is a flowchart illustrating a method for controlling an indoor unit according to an embodiment. Referring to FIG. 8, if a preset reception rate degradation error or a preset reception error occurs in S810, the indoor unit 20 or an indoor unit in the plurality of indoor units 20 (see FIG. 1) may transmit a channel switch request signal or a channel switch request to the outdoor unit 10 belonging to the same group in S820. For example, the preset reception error may include a buffer overflow occurring three times or more within the recent one hour or a checksum error occurring at 10% or more within the recent one hour.

The outdoor unit 10 and a plurality of indoor units 20 may be set as one group. The outdoor unit 10 and the plurality of indoor units 20 in the same group may exchange signals periodically or in response to occurrence of an event. In addition, the outdoor unit 10 and the plurality of indoor units 20 in the same group may be controlled as a group.

The outdoor unit 10 and the plurality of indoor units 20 may wirelessly communicate with each other using a sub-GHz frequency band. In accordance with control by the controller 110, wireless communication modules 120 of the outdoor unit 10 and the plurality of indoor units 20 may wirelessly communicate with each other or other units or devices of the air conditioner system using the sub-GHz frequency band.

A sub-GHz frequency band has excellent transmission and rotation characteristics, and thus may be less attenuated in response to a wall or an inter-floor object. Thus, the wireless communication module 120 may be efficiently used in communication within an air conditioner system that is provided with a plurality of units or devices in a building partitioned by walls or separated by floors.

If another device using the same communication channel or an adjacent communication channel is additionally installed within a predetermined range or predetermined distance from the position or location of the indoor unit 20, or if a data throughput of another device using the same communication channel or an adjacent communication channel is remarkably increased, an amount of data to be received by the indoor unit 20 may be increased.

If the amount of data received by the indoor unit 20 is increased by more than a predetermined level or a predetermined amount, the indoor unit 20 may not able to process received data and thus a buffer overflow may occur. If a buffer overflow occurs a predetermined number of times or more within a predetermined period of time, the indoor unit 20 may determine that a reception error has occurred, or the reception error may reach the preset reception error. In addition, if a checksum error occurs at a predetermined level or more within a predetermined period of time, the indoor unit 20 may determine that a reception error has occurred. In other words, if a buffer overflow occurs a predetermined number of times within a predetermined time period, or if a checksum error occurs at a predetermined level within a predetermined time period, the indoor unit 20 may determine that the reception rate is degraded and/or that the reception error level has reached the preset reception error.

The indoor unit 20 or the plurality of indoor units 20 may then receive a channel scan start command from the outdoor unit 10 belonging to the same group in S830. The plurality of indoor units 20 may perform a channel scan to check a use amount and communication load of each channel in S840.

Each of the indoor units in the plurality of indoor units 20 may perform a channel scan on a plurality of channels or on every channel, which may be pre-set channels set in a predetermined range of frequencies in a sub-GHz band, in a similar manner as the outdoor unit 10. For example, the channel scan may be performed on 20 channels which are preset in a sub-GHz band.

The plurality of indoor units 20 may reduce a channel scan time by checking an amount of communication load of a plurality of channels in an energy detection method. The plurality of indoor units 20 may scan all channels, or pre-set channels, and determine whether a corresponding channel is being used, depending on whether energy is detected in the corresponding channel during the scanning.

When energy equal to or greater than a predetermined energy value is detected, the plurality of indoor units 20 may determine that a corresponding channel is being used. The plurality of indoor units 20 may scan all set channels repeatedly a predetermined number of times, and determine an amount of communication load based on energy detected through the repeated scanning. The indoor units 20 may determine an amount of communication load based on the size of detected energy.

A channel use amount may be determined, not by checking on the basis of each channel by each modulation method, but by checking on the basis of channel idleness, regardless of a type of wireless modulation method. For example, it is possible to measure communication load in an energy detection method for a predetermined period of time, regardless of a type of a modulation method, and to automatically set a communication module when a channel to be used is determined.

In addition, by wirelessly performing a channel scan on sub-GHz band wireless communication, it is possible to check an amount of communication load and use of each channel. Each indoor unit of the plurality of indoor units 20 may transmit channel scan results to the outdoor unit 10 in S850. The outdoor unit 10 may determine a channel to be used in a corresponding group based on a result of a channel scan performed on by the outdoor unit 10 and also the channel scan results received from the plurality of indoor units 20.

The outdoor unit 10 may output information on the determined channel to be used to the plurality of indoor units 20. The information on the determined channel may include a command that instructs setting the determined channel as a communication channel. The wireless communication module 120 of the outdoor unit 10 may broadcast a signal including the information on the determined channel a predetermined number of times, and the respective wireless communication modules 120 of the indoor units 20 may receive the broadcast signal in S860. The indoor units 20 may switch to or set the determined channel as a communication channel in S870.

Figure 9:
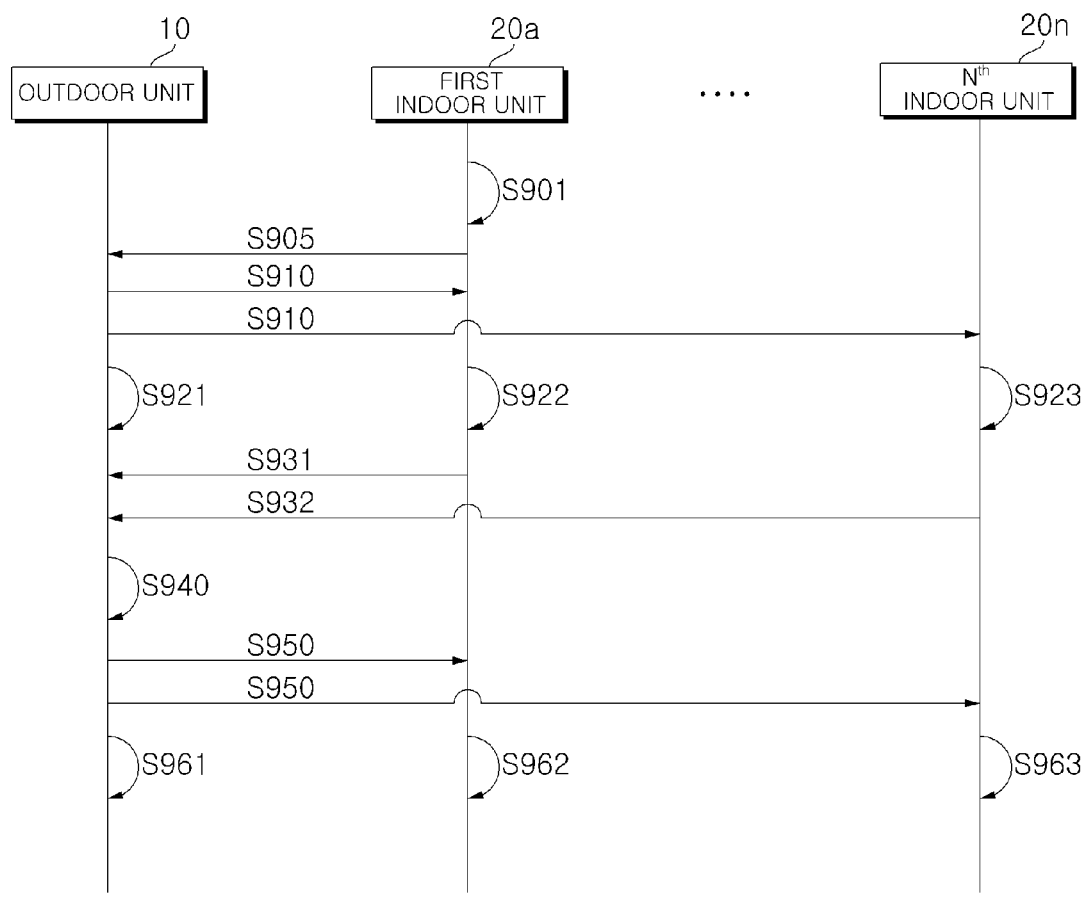
FIG. 9 is a flowchart illustrating a method for controlling an air conditioner system according to an embodiment.

FIG. 9 is a flowchart illustrating a method for controlling an air conditioner system according to an embodiment, and FIGS. 10A-10B, 11A, and 11B are diagrams explaining a method for controlling an air conditioner system according to an embodiment.

Referring to FIG. 9, an outdoor unit 10 and a plurality of indoor units 20a to 20n may be set as one group, and the outdoor unit 10 and the plurality of indoor units 20a to 20n may wirelessly communicate with each other using a sub-GHz frequency band. When a preset reception rate degradation error or a preset reception error occurs or when it is determined that a reception rate has been degraded in S901, one 20a of the plurality of indoor units 20a to 20n belonging to a particular group may transmit a channel switch request signal or a channel switch request to the outdoor unit 10 belonging to the same group in S905. For example, the preset reception error may include a buffer overflow occurring three times or more within the recent one hour or a checksum error occurring at 10% or more within the recent one hour.

FIG. 9 shows an example in which a first indoor unit 20a transmits a channel switch request. An error may occur in another indoor unit out of the plurality of indoor units 20a to 20n, and one or more indoor units having a reception rate error occurring may transmit a channel switch request to the outdoor unit 10 in S905.

To allow a dynamic channel switch, the outdoor unit 10 may transmit a channel scan start command or a channel scan command to the plurality of indoor units 20a to 20n belonging to the particular group in S910. Alternatively, the outdoor unit 10 may output the channel scan command in a broadcast manner.

The outdoor unit 10 and the plurality of indoor units 20a to 20n may each perform a channel scan individually in S921, S922, and S923. The channel scans may be performed on a plurality of channels which is set in a predetermined range of frequencies in a sub-GHz band. For example, the channel scans may be performed on 20 channels which are preset in a sub-GHZ band.

The outdoor unit 10 and the plurality of indoor units 20a to 20n may check an amount of communication load of a plurality of channels in an energy detection method, thereby reducing a channel scan time. The outdoor unit 10 and the plurality of indoor units 20a to 20n may scan all the channels individually, and, depending on whether energy is detected in a channel during the scanning, determine whether the corresponding channel is being used. When energy equal to or greater than a predetermined value is detected in a channel, the outdoor unit 10 and the plurality of indoor units 20a to 20n may determine that the corresponding channel is being used.

Figure 10A:
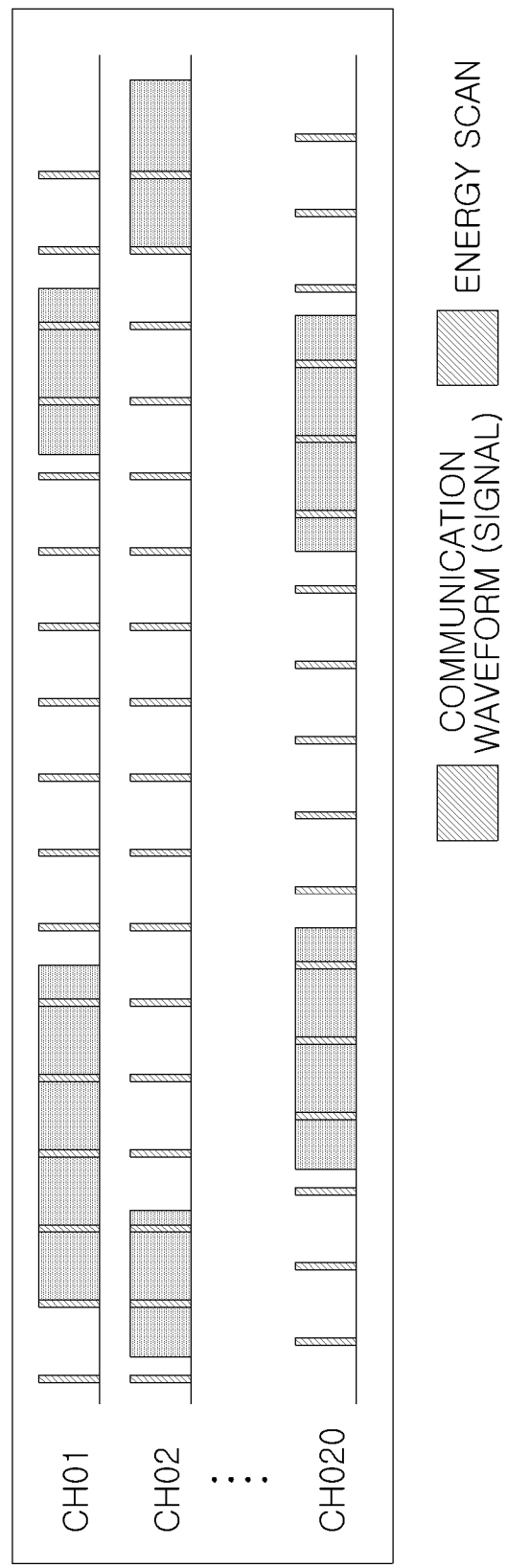

As shown in FIG. 10A, the outdoor unit 10 and the plurality of indoor units 20a to 20n may perform an energy scan to sequentially detect energy per channel. The shorter an energy scan time is, the better it is. The energy scan may be performed on all the channels for a preset period of time. Accordingly, accuracy of the energy scan may be enhanced further.

As shown in FIG. 10B, if an energy scan time for a predetermined channel is set to be relatively long, the probability of failure in the detection of energy occurring in a communication signal of the corresponding channel is increased. Thus, repeatedly performing an energy scan in the channel in a predetermined cycle may help detect energy more accurately.

Thus, the outdoor unit 10 and the plurality of indoor units 20a to 20n may perform a scan on all channels a predetermined number of times, and determine an amount of communication load based on energy detected through the repeated scanning. The outdoor unit 10 and the plurality of indoor units 20a to 20n may determine an amount of communication load based on the size of detected energy.

According to an embodiment, a channel use amount may be determined, not by checking on the basis of each channel by each modulation method, but by checking on the basis of channel idleness, regardless of a type of wireless modulation method. For example, a communication load may be measured in an energy detection method for a predetermined period of time, regardless of a type of a modulation method, and a communication module may be automatically set when a channel to be used is determined.

In addition, by performing a wireless channel scan of wireless communication of a sub-GHz band, it is possible to check an amount of communication load and use of each channel. The plurality of indoor units 20*a* to 20*n* may transmit channel scan results to the outdoor unit 10 in S931 and S932.

The outdoor unit 10 may determine a channel of the corresponding group to be used based on a result of the channel scan performed by the outdoor unit 10 and the results received from the channel scans performed by the plurality of indoor units 20*a* to 20*n* in S940.

A channel to be used may be determined on the basis of results of the channel scans that were individually performed by all units (that is, the outdoor unit 10 and all of the indoor units 20 of the plurality of indoor units) of a group and aggregated by the outdoor unit 10, and may not be determined on the basis of a result of a channel scan performed by a predetermined device alone. The outdoor unit 10 may analyze a difference between channels at each location based on the aggregated channel scan results, and determine that a channel not being used or having the lowest amount of communication load is a channel to be used.

The outdoor unit 10 may use the highest load occupancy rate of each channel in the channel scan results of the outdoor unit 10 and the plurality of indoor units 20*a* to 20*n* as a representative load occupancy rate of a corresponding channel. That is, the "worst" or highest result in all results by each unit for a particular channel may be used as a representative value of the use amount of that channel. For example, in FIG. 11A, the representative load occupancy rate of channel 1 or CH01 would be determined to be 40%.

FIG. 11A shows an example of a channel scan result. In the example of FIG. 11A, a representative value for CH01, or channel 1, may be set to 40% from among 40%, 30%, and 28%. In the same manner, representative values for CH02 (channel 2), CH03 (channel 3), CH04 (channel 4), CH05 (channel 5), and CH06 (channel 6) may be 30%, 0%, 0%, 10%, and 40%, respectively.

If there is only one channel having a load occupancy rate of 0%, the outdoor unit 10 may determine that the channel having the load occupancy rate of 0% is a channel to be used, or the determined channel or the chosen channel. If there is a plurality of channels having a load occupancy rate of 0%, the outdoor unit 10 may determine that a channel with an adjacent channel having the lowest load occupancy rate among the plurality of channels having the load occupancy rate of 0% is the chosen channel.

Referring to the example of FIG. 11A, CH03 and CH04 each have a load occupancy rate of 0%. The outdoor unit 10 may determine one of CH03 and CH04 to be the chosen channel. CH02 and CH04, which are adjacent channels of channel 3, have a load occupancy rate of 30% and a load occupancy rate of 0%, respectively. CH03 and CH05, which are adjacent channels of CH04, have a load occupancy rate of 0% and a load occupancy rate of 10%, respectively. Thus, by selecting CH04 to be the chosen channel, whose adjacent channels have a lower load occupancy rate, the outdoor unit 10 may reduce interference between adjacent channels.

In addition, if there is a plurality of channels having a load occupancy rate of 0%, the outdoor unit 10 may determine that a channel having an adjacent channel with the greatest difference in the measured load occupancy rates from among the plurality of channels having the load occupancy rate of 0% is a channel to be used, or the chosen channel. Even in this case, CH04 may be selected in the example of FIG. 11A.

Alternatively, if there are two or more channels having a load occupancy rate of 0%, a channel having the maximum sum of a square of a difference between the channel and each of two adjacent channels whose load occupancy rate is greater than 0% may be selected.

If there are no channels having a load occupancy rate of 0%, the outdoor unit 10 may determine that a channel having the lowest load occupancy rate is the chosen channel. That is, a channel currently having the lowest communication load may be used. If there are two or more channels equally having a low load occupancy rate, one of the two or more channels may be selected.

FIG. 11B is an example of a channel scan result, showing examples of a representative value of each channel, a homogeneity occupancy rate, and a heterogeneity occupancy rate. The homogeneity occupancy rate indicates a load occupancy rate by loads from units included in the air conditioner system, and a heterogeneity occupancy rate is a load occupancy rate by loads from other electronic devices not included in the air conditioner system.

Referring to the example of FIG. 11B, the outdoor unit 10 may determine that CH01 or CH02 have the lowest load occupancy rate, and may be contenders for the chosen channel. Communication load between units included in the air conditioner system (that is, units in a homogenous network) may be easy to expect and manage compared to other external wireless communication (a heterogeneous network).

Thus, if there is no channel having a load occupancy rate of 0%, a channel having the lowest load occupancy rate by a heterogeneous network may be determined to be the chosen channel. If there is no channel having a load occupancy rate of 0%, the outdoor unit 10 may determine that a channel having the lowest load occupancy rate due to other devices not included in the air conditioner system is the chosen channel.

Referring to the example of FIG. 11B, the outdoor unit 10 may determine that CH01 has a higher homogeneity occupancy rate and a lower heterogeneity occupancy rate than CH02 and may therefore be determined to be the chosen channel.

Meanwhile, even when there is no channel having a load occupancy rate of 0%, the outdoor unit 10 may determine that a channel with an adjacent channel having the lowest load occupancy rate is the chosen channel. If there is a plurality of channels with an adjacent channel having the lowest load occupancy rate, the outdoor unit 10 may determine that a channel having the greatest absolute value of signal strength is the chosen channel. Even when there is no channel having a load occupancy rate of 0%, the outdoor unit 10 may determine that a channel with the greatest difference in a load occupancy rate with an adjacent channel, or a channel having an adjacent channel having the greatest difference in the measured load occupancy rates, is the chosen channel.

The outdoor unit 10 may output information on the determined or chosen channel to the plurality of indoor units 20*a* to 20*n* in S950. The information on the determined channel or the determined communication channel may include a command that instructs setting the determined channel as a communication channel.

The wireless communication module 120 of the outdoor unit 10 may broadcast a signal including the information on the determined channel a predetermined number of times, and the wireless communication module 120 of each of the plurality of indoor units 20*a* to 20*n* may receive the broadcasted signal. The outdoor unit 10 and the plurality of indoor units 20*a* to 20*n* may set the determined channel as a communication channel in S961, S962, and S963.

In a building, an apartment, and any case where many products are wirelessly connected, embodiments disclosed herein may determine an available frequency band from among limited frequency resources and automatically determine an optimal frequency without a user's setting. In addition, when attempting to change a channel, an installer, an engineer, a SVC man, or a user, for example, may be able to check the optimal communication channel and manually change a channel.

Accordingly, equipment such as an additional spectrum analyzer may not be necessary, and the most comfortable channel environment may be confirmed with low costs. In the use of wireless communication, a communication success rate may be reduced to a predetermined level or lower due to interfering signals or increased loads in the environment of a channel in use according to a change in a surrounding environment. When the quality of communication is degraded to a predetermined level or more, another channel scan may be performed in a wireless communication environment and so that there may be another switch to a wireless channel having no interfering frequency and a small usage amount.

Figure 12:
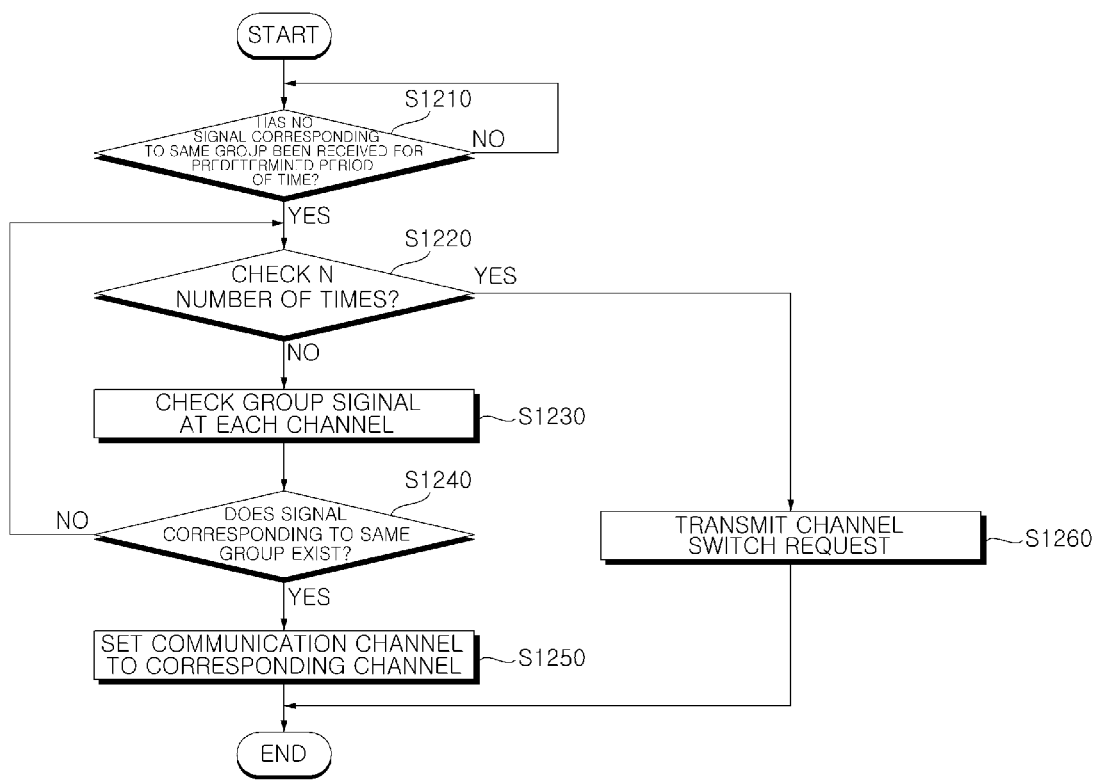

FIG. 12 is a flowchart illustrating a method for controlling an air conditioner system according to an embodiment. Referring to FIG. 12, if a No Reception event, or an event that indicates that one of a plurality of indoor units 20 belonging to a particular group has received no signal within a predetermined period of time, occurs in S1210, the one or corresponding indoor unit 20 where the No Reception event has occurred may check a signal corresponding to the particular group at each channel in S1230. For example, the No Reception event may indicate that information on an outdoor unit 20 has not been received for three minutes.

The corresponding indoor unit 20 may check signals transmitted by units or devices belonging to the same group, such as other indoor units in the plurality of indoor units 20, the outdoor unit 10, or a controller. If there are signals transmitted by the units or devices belonging to the same group in S1240, the corresponding indoor unit may set a communication channel in accordance with the signals in S1250.

Take an example where the current communication channel is a first channel. If a signal corresponding to the particular group at the first channel in use is checked in S940, and it is determined that there is reception, the indoor unit 20 may maintain the first channel in S1250. That is, if there is a communication signal from another indoor unit in the plurality of indoor units 20 at the same channel, there may not be a channel problem, and thus, a channel may not be switched.

If a signal corresponding to the particular group is found at a second channel other than the first channel in use in S1240, the indoor unit 20 may switch a communication channel to the second channel in S1250. When an outdoor unit 10 and a plurality of indoor units 20 belonging to the same group switches a communication channel, some indoor units in the plurality of indoor units 20 may fail to switch the communication channel due to a power-off state or temporary malfunction.

In this case, if an indoor unit 20 is powered on or the malfunction is solved, the indoor unit 20 may search for a communication channel again, may identify a group ID of the corresponding group from received signals, and may switch to the corresponding channel.

On the other hand, if a signal corresponding to the particular group is not found in S1240, the corresponding indoor unit 20 may check whether a signal transmitted by the units or devices belonging to the same group exists at each channel in S930. The corresponding indoor unit 20 may repeatedly check a group signal at each channel in S1230. If the number of times of checking reaches a predetermined number N while no signal from a unit belonging to the same group has been sensed in S1220, the corresponding indoor unit 20 may transmit a channel switch request to the outdoor unit 10 belonging to the particular group in S1260.

That is, if a signal from a unit or device belonging to the same group is sensed at a particular channel, the corresponding indoor unit 20 may switch to the channel; if not, the indoor unit 20 may not be able to communicate with another indoor unit 20 or another unit or device belonging to the same group.

Thus the indoor unit 20 that may not be able to communicate may request the outdoor unit 10 to switch a communication channel of the whole group, and the outdoor unit 10 and the plurality of indoor units 20 belonging to the group may switch the communication channel in a manner described above with reference to FIG. 9.

Embodiments disclosed herein may allow an air conditioner system to switch to a good, available, high-quality, or relatively free communication channel according to a change in a communication environment. Embodiments disclosed herein may allow an air conditioner system to set an optimal communication channel.

Embodiments disclosed herein may create a high-quality wireless communication environment and may provide an air conditioner system which allows units or devices to wirelessly communicate directly with each other regardless of an installation environment, and a control method of the system.

An electronic device or unit, a mobile terminal, and an air conditioner system may not be limitedly applicable to the configurations and methods of the embodiments as described above. For example, all or some of the embodiments may be selectively combined to achieve various modifications.

A control method of the electronic device or unit, the mobile terminal, and the air conditioner system may be implemented as code that can be written on a computer-readable medium in which a program is recorded and thus read by a computer. The computer-readable medium may include all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). Furthermore, the recording medium readable by a processor may be distributed over computer systems connected over a network, and the code readable by a processor may be stored and executed in a distributed manner.

It is to be understood that the invention is not limited to the disclosed embodiments, but, on the contrary, is intended to cover various modifications and equivalent arrangements included within the spirit and scope of the appended claims.

Embodiments disclosed herein may provide an air conditioner system capable of changing to a good, high-quality, or relatively free communication channel according to a change in a communication environment, and a control method thereof.

Embodiments disclosed herein may provide an air conditioner system capable of setting an optimal wireless communication channel, and a control method thereof. Embodiments disclosed herein may provide an air conditioner system capable of implementing a high-quality wireless communication environment, and a control method thereof. Embodiments disclosed herein may provide an air conditioner system in which each unit or device is capable of wirelessly communicating with one another, regardless of an installation environment, and a control method thereof.

Embodiments disclosed herein may provide a control method of an air conditioner system which comprises one or more groups, each group comprising an outdoor unit and a plurality of indoor units, including, when a preset reception rate degradation error or a preset reception error occurs in one or more indoor units among a plurality of indoor units belonging to a particular group, transmitting a channel switch request signal to an outdoor unit belonging to the particular group; transmitting, by the outdoor unit belonging to the particular group, a channel scan start command to the plurality of indoor units belonging to the particular group; performing a channel scan by each of the outdoor unit and the plurality of indoor units; transmitting, by the plurality of indoor units, channel scan results to the outdoor unit; determining, by the outdoor unit, a channel of the particular group to be used based on a result of a channel scan performed by the outdoor unit and the channel scan results received from the plurality of indoor units; and outputting, by the outdoor unit, information on the determined channel to the plurality of indoor units. Accordingly, it is possible to change to a good communication channel according to a change in communication environment.

Embodiments disclosed herein may allow an air conditioner system to change to a good communication channel according to a change in communication environment, and an optimal communication channel may be set In addition, a high-quality wireless communication environment may be implemented. An air conditioner system in which each unit or device is able to wirelessly communicate with one another regardless of an installation environment, and a control method thereof may be provided. Other effects may be explicitly or implicitly disclosed in the description of the embodiments of embodiments disclosed herein.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an air conditioner system which comprises one or more groups, each group comprising an outdoor unit and a plurality of indoor units, the method comprising:
   transmitting a channel switch request to the outdoor unit belonging to a particular group when a preset reception error rate occurs in one or more indoor units among the plurality of indoor units of the particular group;
   transmitting, by the outdoor unit, a channel scan command to each of the plurality of indoor units;
   performing a channel scan by the outdoor unit and each of the indoor units in the plurality of indoor units;
   transmitting, by each of the indoor units of the plurality of indoor units, results of the channel scan to the outdoor unit;
   determining, by the outdoor unit, a channel to be used among a plurality of channels by the particular group based on the result of the channel scan performed by the outdoor unit and the results of the channel scans received from the plurality of indoor units; and
   outputting, by the outdoor unit, information on the channel to the plurality of indoor units, wherein the determining of the channel to be used comprises, when there is more than one channel having a load occupancy rate of 0%, selecting a channel with a greatest difference in a load occupancy rate from an adjacent channel from among the plurality of channels having the load occupancy rate of 0%.

2. The method of claim 1, wherein the outdoor unit and the plurality of indoor units perform wireless communication using a sub-GHZ frequency band.

3. The method of claim 1, wherein the performing of the channel scan comprises checking, by each of the outdoor unit and the plurality of indoor units, an amount of communication load of the plurality of channels using an energy detection method.

4. The method of claim 1, wherein the determining of the channel to be used comprises, when there is only one channel of the plurality of channels having a load occupancy rate of 0%, selecting the channel having the load occupancy rate of 0%.

5. The method of claim 1, wherein the determining of the channel to be used comprises, when there is no channel having a load occupancy rate of 0%, selecting a channel having a lowest load occupancy rate.

6. The method of claim 1, wherein the determining of the channel to be used comprises, when there is no channel having a load occupancy rate of 0%, selecting a channel having a lowest load occupancy rate due to other devices not included in the air conditioner system.

7. The method of claim 1, wherein the determining of the channel to be used comprises, when there is no channel having a load occupancy rate of 0%, selecting a channel with an adjacent channel having a lowest load occupancy rate.

8. The method of claim 7, wherein, when there is more than one channel with respective adjacent channels having a lowest load occupancy rate, selecting a channel having a greatest absolute value of signal strength.

9. The method of claim 1, wherein the determining of the channel to be used comprises, when there is no channel having a load occupancy rate of 0%, selecting a channel with a greatest difference in a load occupancy rate from an adjacent channel.

10. The method of claim 1, wherein the outputting, by the outdoor unit, of information on the channel to the plurality of indoor units comprises broadcasting, by the outdoor unit, the information on the channel to the plurality of indoor units a predetermined number of times.

11. The method of claim 1, wherein the determining of the channel to be used comprises using a highest load occupancy rate of each channel in results of the channel scans of the outdoor unit and the plurality of indoor units as a representative load occupancy rate of a corresponding channel.

12. The method of claim 1, further comprising switching, by the outdoor unit and the plurality of indoor units belonging, a communication channel to the channel.

13. The method of claim 1, further comprising, when no signal has been received in a first channel currently in use for a predetermined period of time in at least one of the indoor units of the plurality of indoor units, checking, by the at least one indoor unit, a signal in each channel of the plurality of channels.

14. The method of claim 13, further comprising, when a signal is found in a second channel other than the first channel, switching a communication channel to the second channel.

15. The method of claim 13, further comprising, when a signal is not found in the plurality of channels, transmitting the channel switch request to the outdoor unit.

16. The method of claim 1, wherein a preset reception error rate occurs when a buffer overflow occurs a predetermined number of times within a predetermined time period.

17. The method of claim 1, wherein a preset reception error rate occurs when a checksum error occurs at a predetermined level or more within a predetermined period of time.

18. The method of claim 1, wherein a preset reception error rate is determined using a Cyclic Redundancy Check (CRC).

19. A method for controlling an air conditioner system which comprises one or more groups, each group comprising an outdoor unit and a plurality of indoor units, the method comprising:
   transmitting a channel switch request to the outdoor unit belonging to a particular group when a preset reception error rate occurs in one or more indoor units among the plurality of indoor units of the particular group;
   transmitting, by the outdoor unit, a channel scan command to each of the plurality of indoor units;
   performing a channel scan by the outdoor unit and each of the indoor units in the plurality of indoor units;
   transmitting, by each of the indoor units of the plurality of indoor units, results of the channel scan to the outdoor unit;
   determining, by the outdoor unit, a channel to be used among a plurality of channels by the particular group based on the result of the channel scan performed by the outdoor unit and the results of the channel scans received from the plurality of indoor units; and
   outputting, by the outdoor unit, information on the channel to the plurality of indoor units, wherein the determining of the channel to be used comprises, when there is more than one channel having a load occupancy rate of 0%, selecting a channel that has both a load occupancy rate of 0% and an adjacent channel having a lowest load occupancy rate among all of the channels that are adjacent to channels having the load occupancy rate of 0%.

20. A method for controlling an air conditioner system which comprises one or more groups, each group comprising an outdoor unit and a plurality of indoor units, the method comprising:

transmitting a channel switch request to the outdoor unit belonging to a particular group when a preset reception error rate occurs in one or more indoor units among the plurality of indoor units of the particular group;

transmitting, by the outdoor unit, a channel scan command to each of the plurality of indoor units;

performing a channel scan by the outdoor unit and each of the indoor units in the plurality of indoor units;

transmitting, by each of the indoor units of the plurality of indoor units, results of the channel scan to the outdoor unit;

determining, by the outdoor unit, a channel to be used among a plurality of channels by the particular group based on the result of the channel scan performed by the outdoor unit and the results of the channel scans received from the plurality of indoor units; and outputting, by the outdoor unit, information on the channel to the plurality of indoor unit, wherein the determining of the channel to be used comprises, when there is no channel having a load occupancy rate of 0%, selecting a channel with a greatest difference in a load occupancy rate from an adjacent channel.

* * * * *